(12) United States Patent
Wayenberg

(10) Patent No.: US 11,908,078 B2
(45) Date of Patent: Feb. 20, 2024

(54) METHOD FOR RENDERING 2D AND 3D DATA WITHIN A 3D VIRTUAL ENVIRONMENT

(71) Applicant: Shape Labs Inc., San Francisco, CA (US)

(72) Inventor: Alexandre Charles M. Wayenberg, San Francisco, CA (US)

(73) Assignee: Shape Labs Inc., San Francisco, CA (US)

( * ) Notice: Subject to any disclaimer, the term of this patent is extended or adjusted under 35 U.S.C. 154(b) by 0 days.

(21) Appl. No.: 17/561,600

(22) Filed: Dec. 23, 2021

(65) Prior Publication Data

US 2022/0122323 A1    Apr. 21, 2022

Related U.S. Application Data

(63) Continuation of application No. 16/796,816, filed on Feb. 20, 2020, now Pat. No. 11,244,503, which is a continuation of application No. 16/408,291, filed on May 9, 2019, now Pat. No. 10,607,408, which is a
(Continued)

(51) Int. Cl.
| | |
|---|---|
| *G06T 17/20* | (2006.01) |
| *G06T 11/20* | (2006.01) |
| *G06T 15/04* | (2011.01) |
| *G06T 7/00* | (2017.01) |
| *G06T 7/55* | (2017.01) |
| *G06T 7/90* | (2017.01) |

(52) U.S. Cl.
CPC ............... *G06T 17/20* (2013.01); *G06T 7/55* (2017.01); *G06T 7/90* (2017.01); *G06T 7/97* (2017.01); *G06T 11/20* (2013.01); *G06T 15/04* (2013.01); *G06T 2200/08* (2013.01); *G06T 2207/10016* (2013.01); *G06T 2207/10024* (2013.01); *G06T 2207/10028* (2013.01)

(58) Field of Classification Search
None
See application file for complete search history.

(56) References Cited

U.S. PATENT DOCUMENTS 9,779,479 B1 * 10/2017 Makinen .................. G06F 3/14
2008/0120574 A1 * 5/2008 Heredia ............... G06Q 10/063
715/835
(Continued)

*Primary Examiner* — Edemio Navas, Jr.
(74) *Attorney, Agent, or Firm* — Run8 Patent Group, LLC; Peter Miller; Danielle D. Michaud

(57) ABSTRACT

One variation of a method for modeling a human body includes: driving a sensor block along a path above a platform occupied by a user and recording a sequence of depth images and color images, via the sensor block, at each capture position in a sequence of capture positions along the path; compiling the set of depth images into a low-density 3D model of the user and a high-density 3D model of the user; extracting a set of color patches, from the sequence of color images, corresponding to discrete regions on a surface of the low-density 3D model of the user; projecting the set of color patches onto the surface of the low-density 3D model to generate a 3D color model of the user; and extracting a value of a dimension, projected from the low-density 3D color model onto the high-density 3D model, from the high-density 3D model.

20 Claims, 8 Drawing Sheets

Related U.S. Application Data continuation-in-part of application No. 15/612,013, filed on Jun. 2, 2017, now abandoned.

(60) Provisional application No. 62/345,787, filed on Jun. 4, 2016.

(56) References Cited

U.S. PATENT DOCUMENTS

| | | | |
|---|---|---|---|
| 2010/0260405 A1* | 10/2010 | Cinader, Jr. | A61C 7/00 382/128 |
| 2012/0072170 A1* | 3/2012 | McKendrick | G01B 11/005 702/150 |
| 2012/0106830 A1* | 5/2012 | Bama | G06T 7/44 382/154 |
| 2015/0262405 A1* | 9/2015 | Black | G06T 7/50 345/420 |
| 2015/0339470 A1* | 11/2015 | Bates | G06F 21/36 726/18 |
| 2016/0191995 A1* | 6/2016 | el Kaliouby | H04N 21/812 725/12 |
| 2016/0255329 A1* | 9/2016 | Lee | H04N 13/211 382/154 |
| 2017/0076487 A1* | 3/2017 | Moore | A61B 5/1079 |
| 2017/0172662 A1* | 6/2017 | Panescu | A61B 34/37 |
| 2018/0137640 A1* | 5/2018 | Farahbakhshian | G06T 5/009 |

* cited by examiner

METHOD FOR RENDERING 2D AND 3D DATA WITHIN A 3D VIRTUAL ENVIRONMENT

CROSS-REFERENCE TO RELATED APPLICATIONS

This Application is a continuation application of U.S. patent application Ser. No. 16/796,816, filed on 20 FEB. 2020, which is a continuation application of U.S. patent application Ser. No. 16/408,291, filed on 9 MAY 2019, which is a continuation-in-part application of U.S. patent application Ser. No. 15/612,013, filed on 2 JUN. 2017, which claims the benefit of U.S. Provisional Application No. 62/345,787, filed on 4 JUN. 2016, each of which is incorporated in its entirety by this reference.

TECHNICAL FIELD

This invention relates generally to the field of 3D scanning and more specifically to a new and useful method for rendering 2D and 3D data within a 3D virtual environment in the field of 3D scanning.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1A:
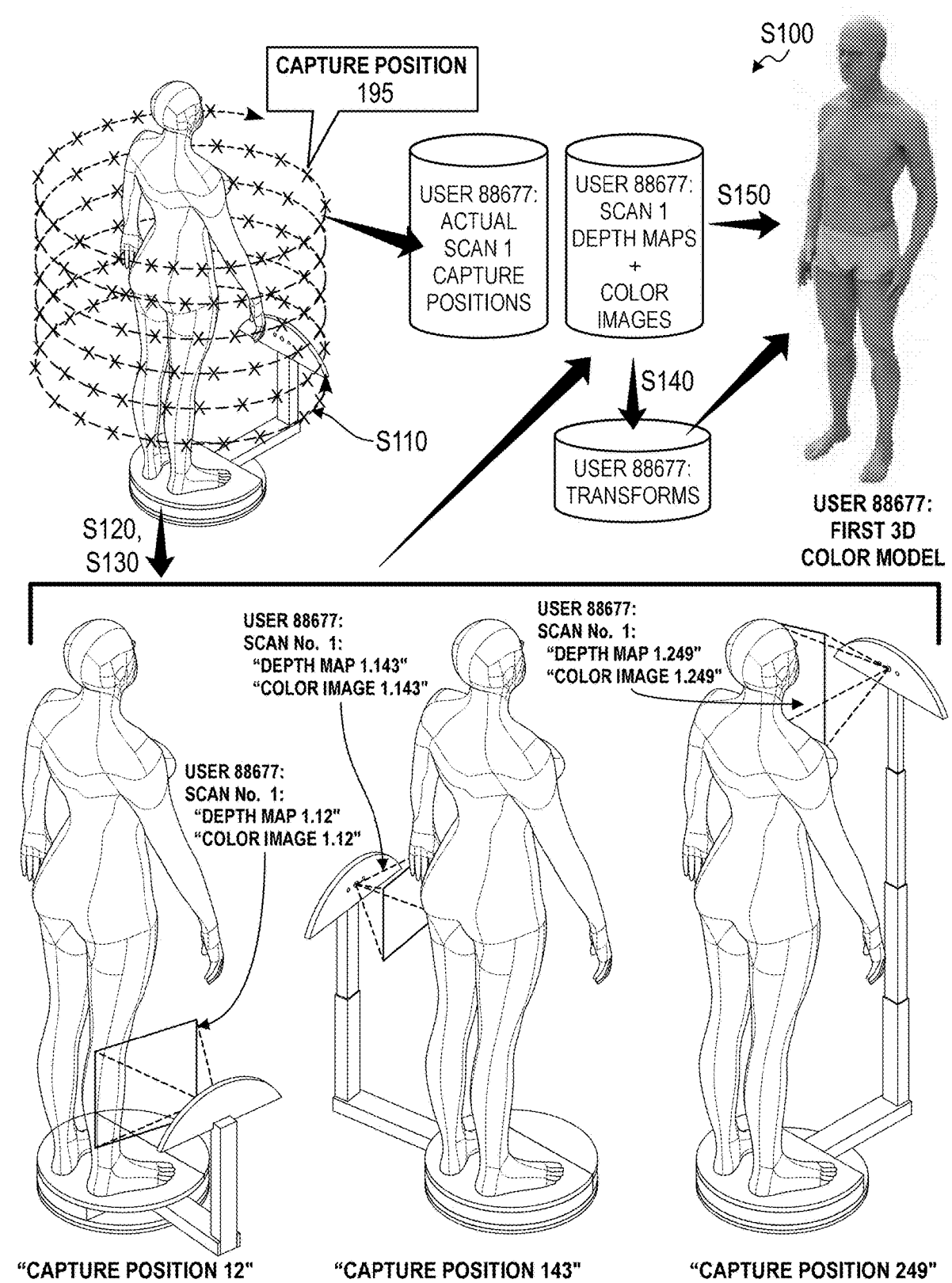
FIGS. 1A and 1B are flowchart representations of a method.
Figure 1B:
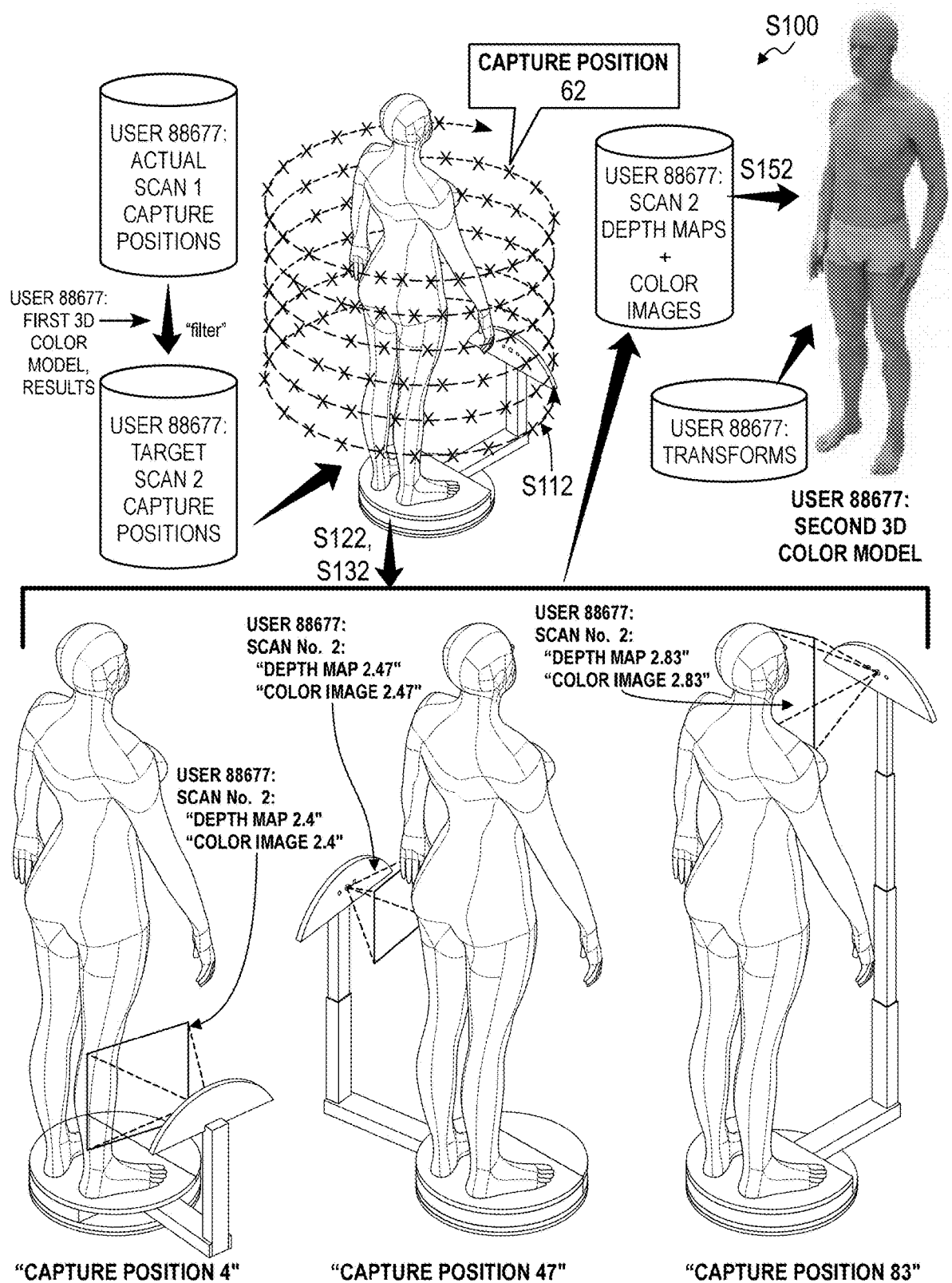
Figure 2:
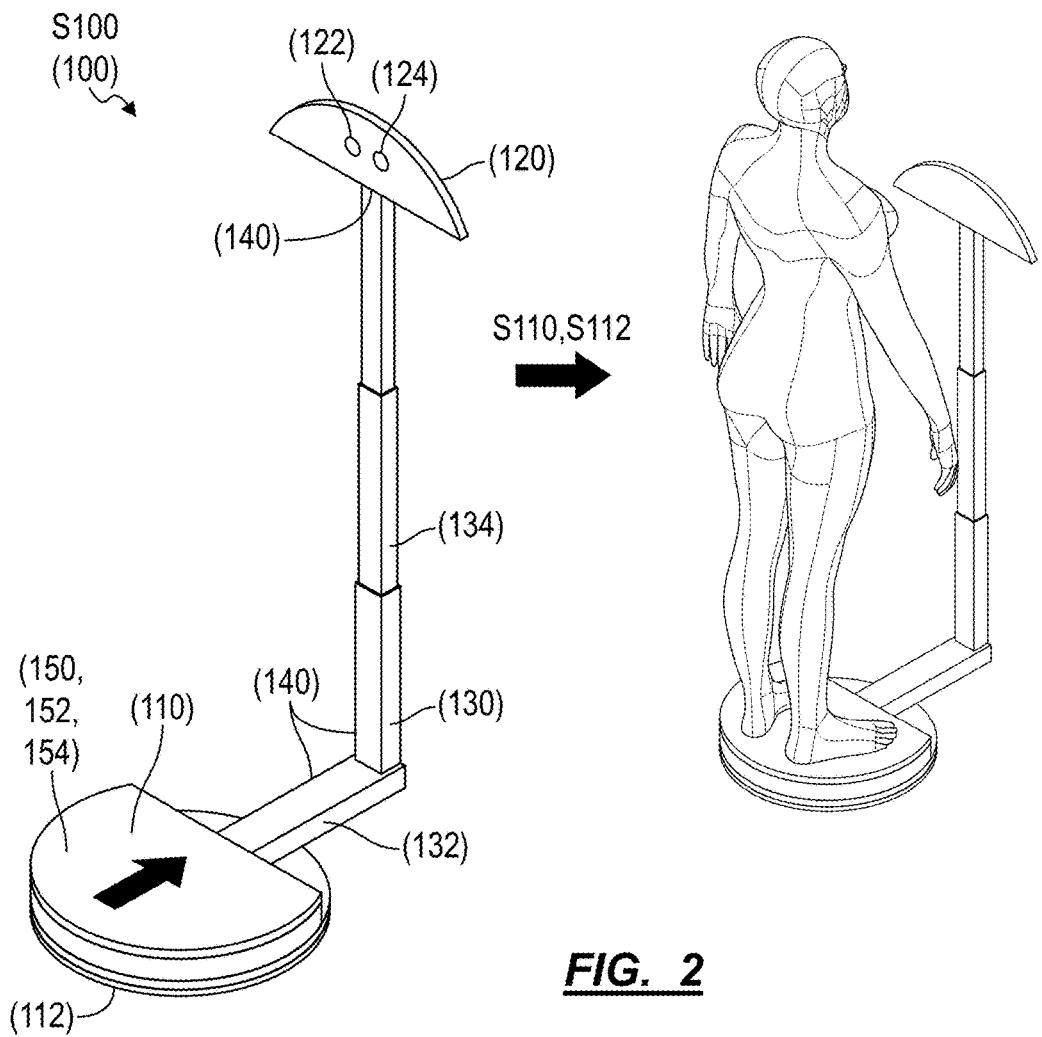
FIG. 2 is a flowchart representation of one variation of the method.
Figure 3:
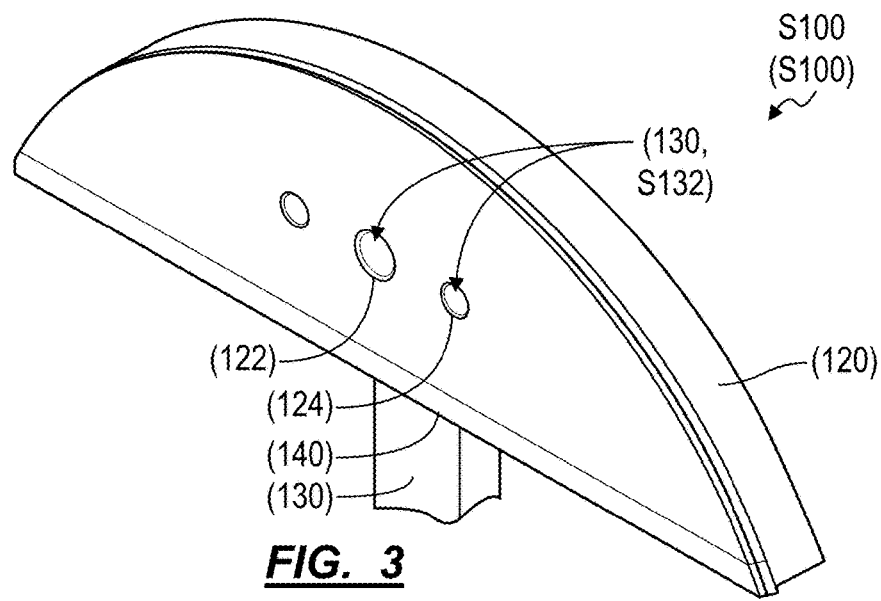
FIG. 3 is a schematic representation of one variation of the method.
Figure 4:
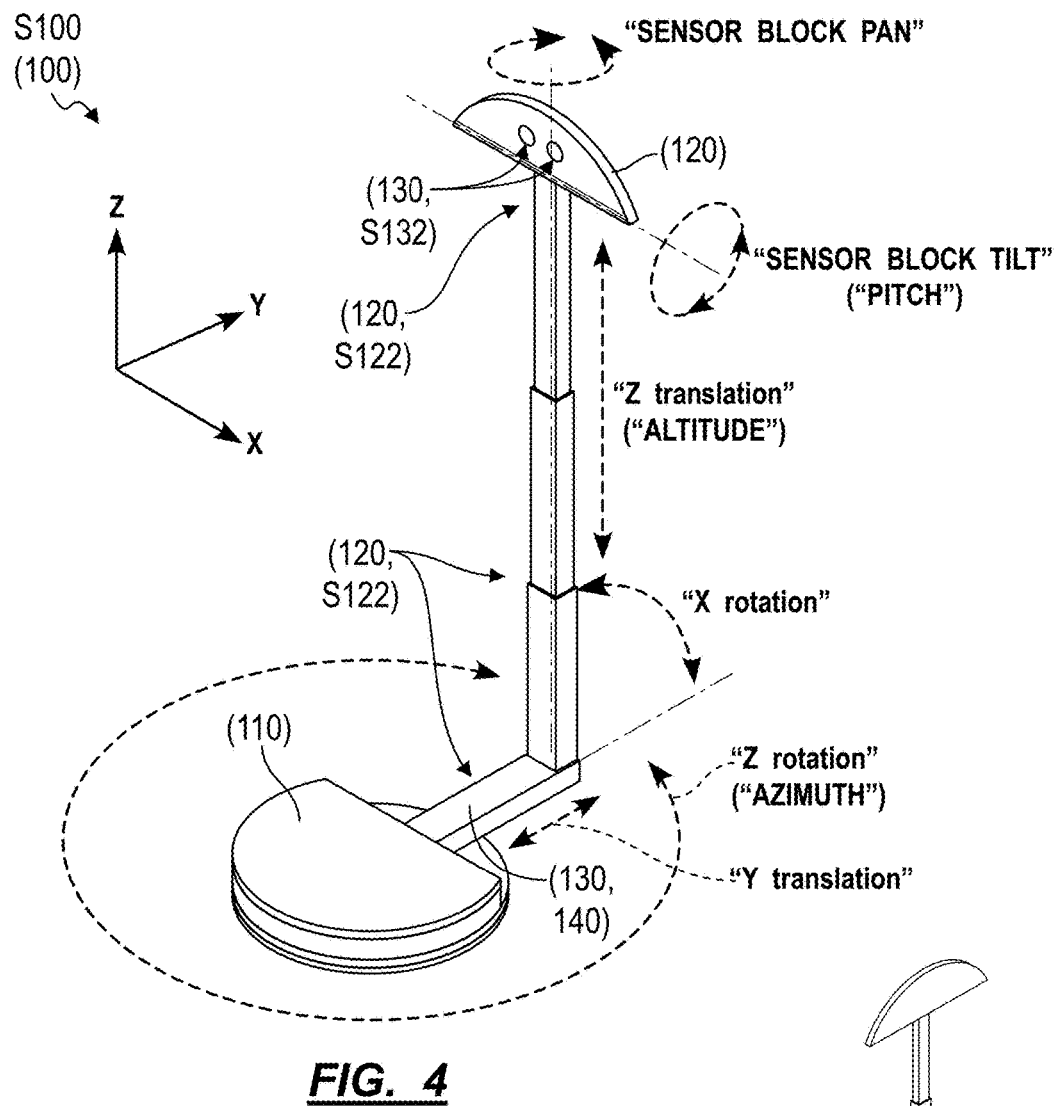
FIG. 4 is a schematic representation of one variation of the method.
Figure 5:
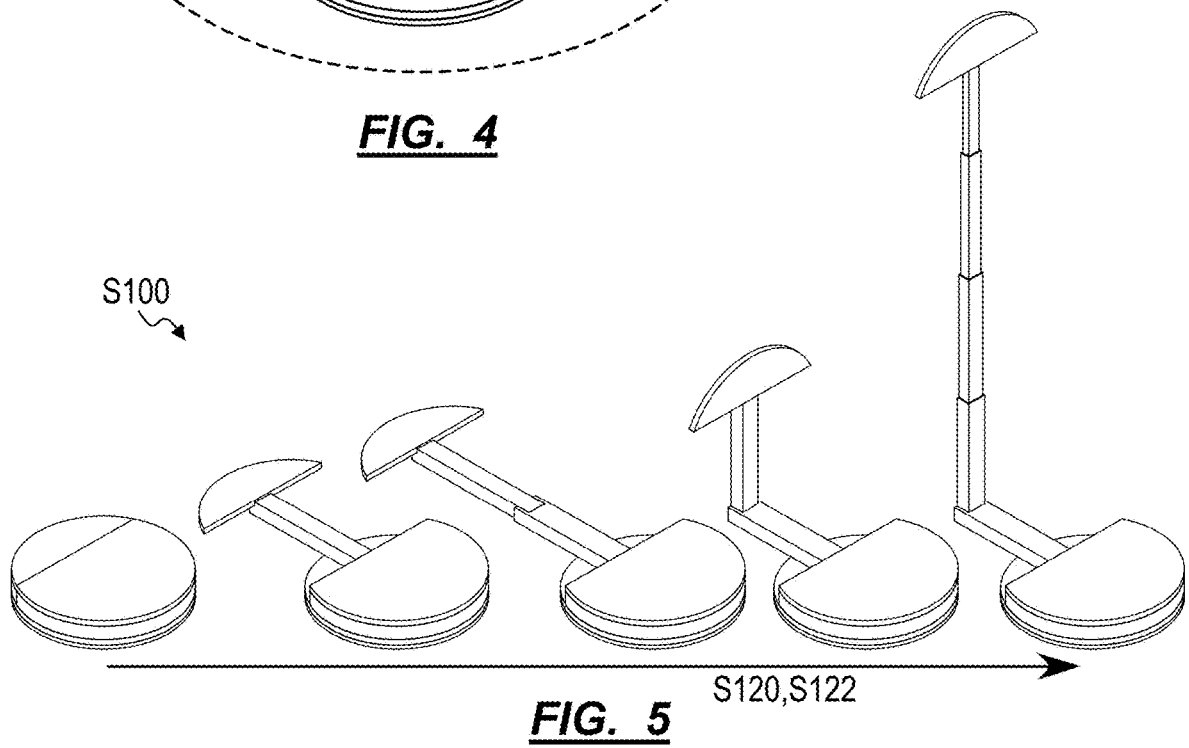
FIG. 5 is a flowchart representation of one variation of the method.

As shown in FIGS. 1A and 1B, a method S100 for modeling a human body includes: initiating a first scan cycle while a user occupies a scale platform at a first time in Block S110; during the first scan cycle, driving a depth sensor along a path above the platform and about the user in Block S120; recording a first sequence of depth images, via the depth sensor, at each capture position in a first sequence of capture positions at a first density along the path in Block S130; calculating a first set of transforms that align the first sequence of depth images in Block S140; and compiling the first set of depth images according to the first set of transforms to generate a first three-dimensional (hereinafter "3D") model of the user for the first time in Block S150. The method S100 also includes: initiating a second scan cycle while the user occupies the scale platform at a second time succeeding the first time in Block S112; during the second scan cycle, driving the depth sensor along the path in Block S122; recording a second sequence of depth images, via the depth sensor, at each capture position in a second sequence of capture positions at a second density less than the first density along the path in Block S132; and compiling the second set of depth images according to the first set of transforms to generate a second 3D model of the user for the second time in Block S152.

Figure 8:
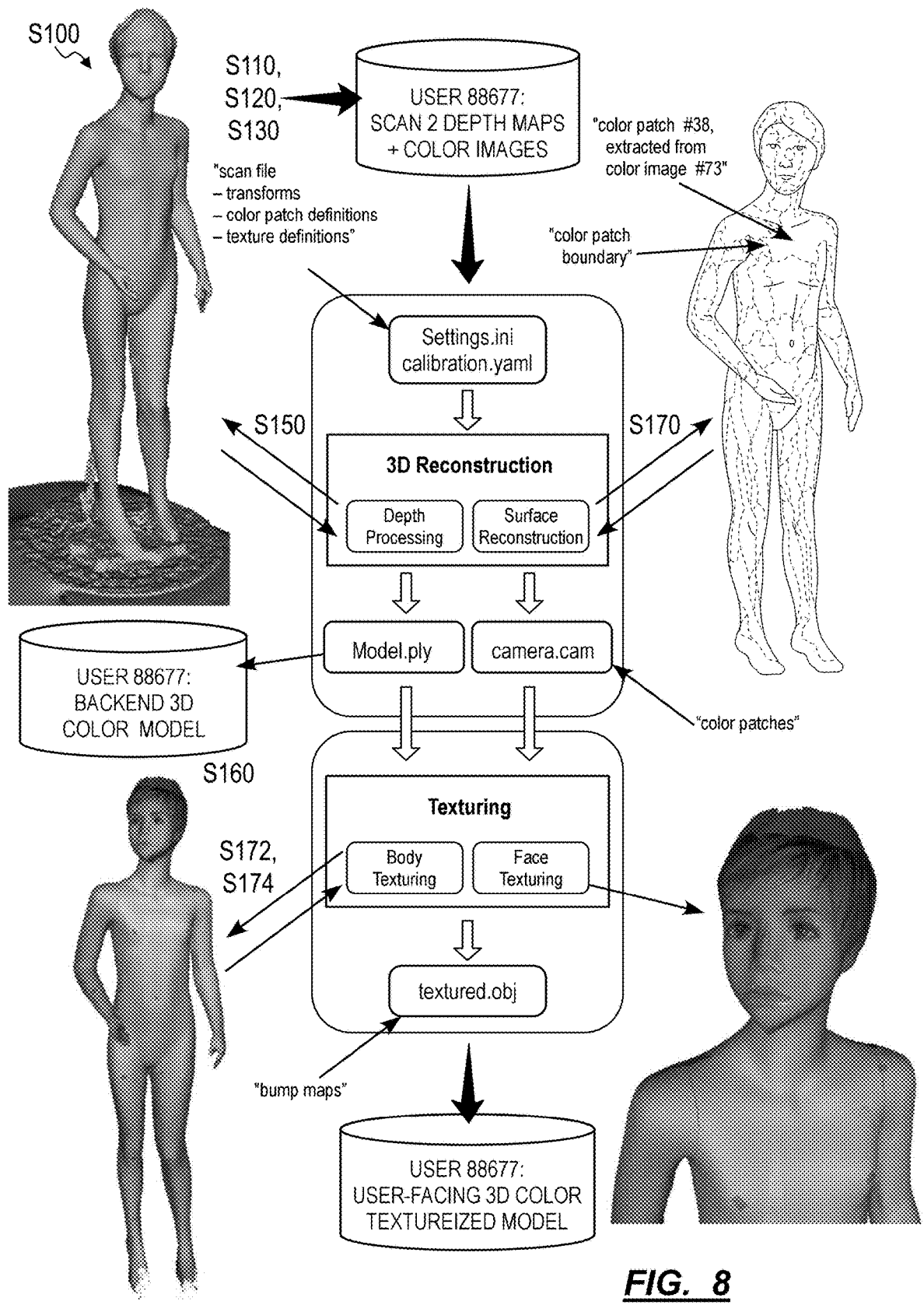
FIG. 8 is a flowchart representation of one variation of the method.

One variation of the method S100 shown in FIGS. 1A, 1B, and 8 includes: during the second scan cycle, driving the depth sensor along the path in Block S122; recording a second sequence of depth images, via the depth sensor, corresponding to a second sequence of capture positions at the first density along the path in Block S132; and compiling a subset of the second set of depth images according to the first set of transforms to generate a second 3D model of the user for the second time in Block S152.

Figure 9:
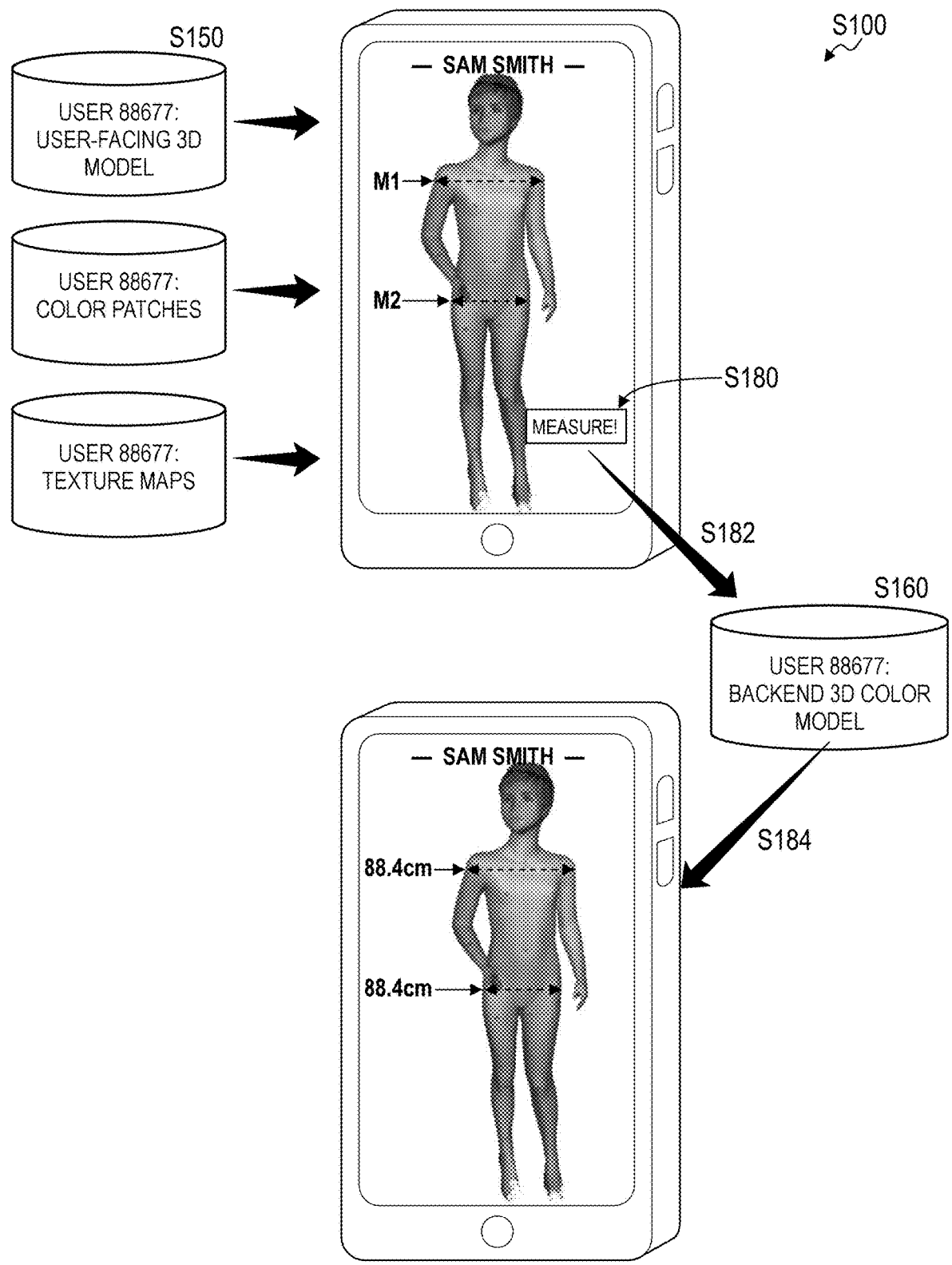
FIG. 9 is a flowchart representation of one variation of the method.

Another variation of the method S100 shown in FIGS. 8 and 9 includes: initiating a scan cycle while a user occupies a scale platform in Block S110; during the scan cycle, driving a sensor block along a path above the platform and about the user in Block S120; recording a sequence of depth images and a sequence of color images, via the sensor block, at each capture position in a sequence of capture positions along the path in Block S130; compiling the set of depth images into a low-density 3D model of the user in Block S150; compiling the set of depth images into a high-density 3D model of the user in Block S160; extracting a set of color patches, from the sequence of color images, corresponding to a set of discrete regions on a surface of the low-density 3D model of the user in Block Sil o; projecting the set of color patches onto the surface of the low-density 3D model to generate a 3D color model of the user in Block S172; receiving selection of a dimension on the low-density 3D color model in Block S180; extracting a value of the dimension, projected from the low-density 3D color model onto the high-density 3D model, from the high-density 3D model in Block S182; and returning the value of the dimension in Block S184.

2. Applications

Generally, Blocks of the method S100 can be executed by a scanning system, a remote computer system, and/or a local computing device: to leverage computation power to transform scan data collected during a first scan cycle into a first 3D color model defining a high accuracy, high-resolution representation of the unique surface anatomy of a user; and to then leverage functions for compiling scan data from this first scan cycle to transform similar scan data recorded during a later scan cycle into a similarly-accurate, similarly-high-resolution 3D color model of the user but in less time and/or with the limited computational power of the local computing device.

2.1 Efficient Generation of 3D Color, Texturized Models

More specifically, Blocks of the method S100 can be executed by scanning the system to record a first sequence of depth images (e.g., depth maps or 3D point clouds) and color images (e.g., two-dimensional—or hereinafter "2D"—color photographic images) while scanning a sensor block (e.g., containing a depth sensor and a color camera) around a user during a first scan cycle in which the user occupies the scanning system. A remote computer system can then execute other Blocks of the method S100 to: access the first sequence of depths maps and color images; calculate a first set of transforms (or "maps," 3D transformations) that align surfaces represented by points in these depth images; compile some or all of these depth images into a 3D model that represents the surface anatomy of the user with a high degree of accuracy; and extract a first set of color patches—from this first sequence of color images—that depict discrete areas on the user. The remote computer system can then render the first set of color patches over corresponding regions on the surface of the first 3D model of the user to generate a first 3D color image of the user and return this first 3D color model to the user's computing device (e.g., a tablet, a smartphone, a laptop) for display within a native application or web browser. The remote computer system can also: estimate different skin, hair, and other surface types and textures (e.g., cellulitis, eczema) on the user based on features detected in these color patches; retrieve 2D or 3D texture models for these various texture types; and project these 2D or 3D texture models onto these color patches or onto the 3D model itself, respectively, in order to further augment authenticity of this first 3D color model of the user.

In particular, the scanning system can cooperate with the remote computer system to leveraging high-bandwidth connectivity and extensive computing resources on a computer network to quickly compile scan data from a first scan of a user into a high-resolution, high-accuracy 3D color model of the user to then return this 3D color model to a local computing device (e.g., the user's smartphone) for immediate presentation to the user, thereby providing the user rapid feedback following a first interaction with the scanning system. (Alternatively, the local computing device can access and render the first 3D model and the first set of color patches locally before displaying the resulting 3D color model for the user.)

However, recalculating new transforms to align scan data collected by the scanning system during a next scan cycle may be similarly computationally expensive and may therefore require that these data be uploaded to the remote computer system for remote processing, and offloading these scan data may again be bandwidth intensive. Therefore, during a second cycle with the user—such as hours, days, or weeks after the first scan cycle with the user—the scanning system can: drive the sensor block along the same or similar path; capture a second sequence of depth images and color images at a lower density of positions along the path; and offload these scan data to the user's local computing device. A native or browser-based application executing on the local computing device can then: retrieve the first set of transforms calculated for the first (i.e., earlier) scan cycle, which may be substantially unique to the user due to the user's height and geometry; initialize alignment of this second sequence of scan depth images based on first set of transforms; refine these transforms to minimize spatial error between surfaces represented by points in this second sequence of depth images; and then compile these depth images into a second 3D model of the user. The native or browser-based application executing on the local computing device can also retrieve crop areas and coordinates for the first set of color patches generated for the first 3D color model; transfer these crop areas to the second sequence of color images recorded during the scan to generate a second set of color patches; and locate (or "render") this second set of color patches on the second 3D model of the user based on corresponding coordinates from the first set of color patches. In particular, because the first set of transforms generated during the first scan cycle predict alignment of the second set of depth images from this second scan cycle, the scanning system can record a lower density of depth images that yield less overlap between adjacent depth images during this second scan cycle, and the local computing device can leverage the first set of transforms to calculate initial alignment between these depth images with low or no error despite this reduced overlap between adjacent depth images. Similarly, because color patch definitions were already generated for color images recorded at a small number of positions along the path during the first scan cycle, the scanning system can record a small number of color images at these same positions along the path during this second scan cycle, and the local computing device can leverage color patch definitions from the first scan cycle to extract a second set of color patches directly from color images recorded during this second scan cycle. The local computing device can similarly port texture models from locations in the first set of color patches or regions of the first 3D model onto corresponding locations in the second set of color patches or onto corresponding regions of the second 3D model in order to simplify texture augmentation of the second 3D model while limiting or eliminating further processing of these scan data to predict skin, hair, and other surfaces types on the user during the second scan cycle.

Therefore, the native or browser-based application executing on the local computing device can implement Blocks of the method S100 to leverage functions generated by the remote computer system during the first scan cycle: to enable rapid local reconstruction of a 3D color model from scan data recorded during a later scan cycle; and reduce processing time by eliminating upload of raw scan data from the scanning system to the remote computer system and download of this later 3D color model from the remote computer system to the local computing device.

Alternatively, the remote computer system can implement Blocks of the method S100 to leverage functions generated by the remote computer system during the first scan cycle to simplify reconstruction of a 3D color model from scan data recorded during a later scan cycle and to reduce latency from recordation of these scan data to presentation of a new 3D color model for the user, such as: by selectively uploading a limited number of depth images from the scanning system necessary to construct a new 3D model of the user based on transforms generated during the first scan cycle; by selectively uploading a limited number of color images from the scanning system based on color patch definitions generated during the first scan cycle; by selectively compiling these new scan data into a new 3D color model of the user based on the transforms and color patch definitions generated during the first scan cycle.

Therefore, the scanning system, remote computer system, and/or local computing device can execute Blocks of the method S100 to generate a first high-resolution, high-accuracy, color- and texture-realistic 3D model of a user based on scan data recorded during a first scan cycle when the user first engages with the scanning system. The scanning system, remote computer system, and/or local computing device can later execute Blocks of the method S100: to record lower-density scan data of the user during a second, later scan cycle; and to generate a second 3D model of a user that is similarly high-resolution, high-accuracy, color-realistic, and texture-realistic based on this lower-density scan data and with lower bandwidth requirements, reduced processing time, and/or reduced processing load by leveraging results of the first 3D model of the user.

2.2 User-Facing and Backend Models

Furthermore, in addition to generating a user-facing 3D color, texturized model of the user based on scan data recorded during a scan cycle, the remote computer system (or the local computing device) can also transform these same depth images into a backend 3D model of the user defining a higher-density, higher-accuracy 3D mesh. Later, the local computing device (or the scanning system or other local device) can display this 3D color, texturized model of the user and record a selection of a dimension on this 3D color, texturized model from the user, such as: total height; waist circumference; neck circumference shoulder width; or bicep circumference. The local computing device (or the remote computer system) can then: transfer this dimension onto the backend 3D model; extract a value of this dimension from the backend 3D model; and return this value to the user.

The remote computer system and/or the local computing device can therefore: generate a user-facing 3D color, texturized model paired with a backend 3D model defining a higher-mesh density based on the same scan data from one scan cycle; render and display the user-facing 3D color, texturized model, which may define a more compelling and visually authentic representation of the user that the backend 3D model; and extract dimensions—selected at the user-facing 3D color, texturized model—from the backend 3D model, which may define a higher-accuracy representation of the user.

3. Scanning System

Generally, Blocks of the method S100, can be executed by and in conjunction with a scanning system 100, as shown in FIGS. 2, 3, 4, and 5. The scanning system 100 can include: a platform 110; a sensor block 120 containing a depth sensor 122 and a color camera 124; a boom 130 supporting the sensor block 120; and an actuation system 140 configured to sweep the sensor block 120 along a path (e.g., a helical path) above the platform 110.

In one implementation, the platform 110 defines a step surface configured to support a human and contains graphics instructing foot orientation on the scanning system 100. In this implementation, the platform 110 is coupled to a scale 112 configured to output a weight or mass of a human occupying the platform 110. For example, the scale 112 can include a load cell supporting the platform 110 above. The platform 110 can additionally or alternatively a bioimpedance contact sensor configured to measure bioimpedance across a human's feet when standing on the platform 110.!

The boom 130 is coupled to the platform 110 and is configured to support the sensor block 120. For example, the boom 130 can include a horizontal segment 132 extending laterally (or configured to extend laterally) from the platform 110 and configured to rotate about a vertical axis through the platform 110. The boom 130 can also include a vertical segment 134 extending upwardly (or configured to extend upwardly) from the distal end of the horizontal segment 132 of the boom 130.

The sensor block 120 is coupled to the distal end of the vertical segment 134 of the boom 130 and includes a suite of sensors. For example, the sensor block 120 can include a depth sensor 122—such as in the form of a structured light 3D scanner or a pair of calibrated stereoscopic cameras—facing the vertical axis of the platform 110 and configured to output a depth image containing a 3D point cloud representing discrete points on surfaces in its field of view. The sensor block 120 can also include a color camera 124—such as an RGB CMOS or CCD camera—similarly facing the vertical axis of the platform no and configured to output a 2D color image. The depth sensor 122 and the color camera can also be time-synchronized to record concurrent depth image and color image pairs during operation, thereby enabling reconstruction of a 3D color model from color images based on calculated transforms that aligned concurrent depth images and a known offset between the depth sensor 122 and the color camera 124. The sensor block 120 can further include an inertial measurement unit (or "IMU") configured to output linear accelerations and rotational velocities of the sensor block 120 throughout a scan cycle. (Alternatively, the sensor block 120 can include a discrete accelerometer and separate gyroscope.) However, the sensor block 120 can include any other quantity and type(s) of sensors.

The actuation system 140 can include: an azimuthal actuator configured to rotate the horizontal segment 132 of the boom 130—and therefore the vertical segment 134 of the boom 130 and the sensor block 120—about the vertical axis of the platform 110; an altitude actuator configured to extend and retract the vertical segment 134 of the boom 130 in order to raise and lower the sensor block 120; and a pitch actuator coupled to (e.g., interposed between) the vertical segment 134 of the boom 130 and the sensor block 120 and configured to sweep the sensor block 120 through a range of pitch (and yaw) positions relative to the vertical segment 134 of the boom 130. The actuation system 140 can also include a set of position sensors—such as optical linear and rotary encoders—configured to output signals indicating absolute position or relative changes in position of the boom and sensor block 120, such as along and about axes shown in FIG. 3.

The scanning system 100 can also include a controller 150 configured to coordinate the actuation system 140 to rotate the sensor block 120 through a path (e.g., a helical path) and to trigger the depth sensor 122 and the color camera 124 to record depth image and color image pairs during a scan cycle. The scanning system 100 can similarly include local memory 152 configured to store local copies of depth images and color images recorded during a scan cycle, such as prior to offloading these scan data upon conclusion of the scan cycle. The scanning system 100 can also include a wireless communication module 154 configured to upload depth images and color images—from local memory 152—to the remote computer system, such as by broadcasting these scan data directly via a local gateway or uploading these scan data to the remote computer system via a user's local computing device. For example, the controller 150, local memory 152, and the wireless communication module 154 can be arranged in the sensor block 120 or in a base under the platform no.

In one variation, the scanning system 100 includes a mobile device mount at the end of the vertical segment 134 of the boom 130—in place of the sensor block 120. The controller in the scanning system 100 can then selectively trigger a mobile device (e.g., a smartphone, a tablet)—when installed in the mobile device mount—to capture depth images and/or color images as the scanning system 100 executes a scan cycle. Alternatively, in the variation, a controller in the mobile device can serve commands to actuators in the scanning system 100 drive the mobile device mount through a path during a scan cycle and can locally capture depth images and color images accordingly.

The scanning system 100 can also include a power supply, such as in the form of a battery and/or a power regulator arranged in the base under the platform 110.

In one variation, other Blocks of the method S100 are executed by the remote computer system, such as a computer network or remote server, to transform scan data into a 3D color, texturized model of a user. Blocks of the method S100 can additionally or alternatively be executed by a native application or web-browser executing on a local computing device (e.g., a smartphone, a tablet, a laptop computer) to transform scan data into a 3D color, texturized model of a user, such as with the benefit of transforms, color patch, and texture data generated by the remote computer system based on scan data from earlier scan of the user.

4. First Scan

Blocks S110, S120, and S130 of the method S100 recite: initiating a first scan cycle while a user occupies a scale platform at a first time; driving a depth sensor along a path above the platform and about the user during the first scan cycle; and recording a first sequence of depth images via the depth sensor and/or color images via the color camera at each capture position in a first sequence of capture positions at a first density along the path, respectively. Generally, in Block S110, the scanning system can initiate a new scan cycle with a user, such as when the user steps on the platform or manually triggers a new scan cycle at her local computing device. During this scan cycle, the controller can coordinate the actuator to scan the sensor block around the user—now standing on the platform—in Block S120 while the depth sensor and the color camera record depth images and color images of the user, respectively, in Block S130. In particular, the scanning system can execute a new scan cycle to autonomously record a sequence of depth images and color images of the user in Blocks S110, S120, and S130. The remote computer system can later access these scan data to automatically construct an authentic, color-true, texturized representation of the user.

In one example shown in FIGS. 1A and 1B, the scanning system drives the actuation system to sweep the sensor block about a preset (or "fixed," preplanned, static) path centered about the vertical axis of the platform and rising from proximal the platform to a maximum height of two meters above the platform while the user occupies (i.e., stands on) the platform. In this example, as the sensor block sweeps along this path, the depth sensor can record a sequence of depth images, and the color camera can record a concurrent sequence of color images.

Figure 6:
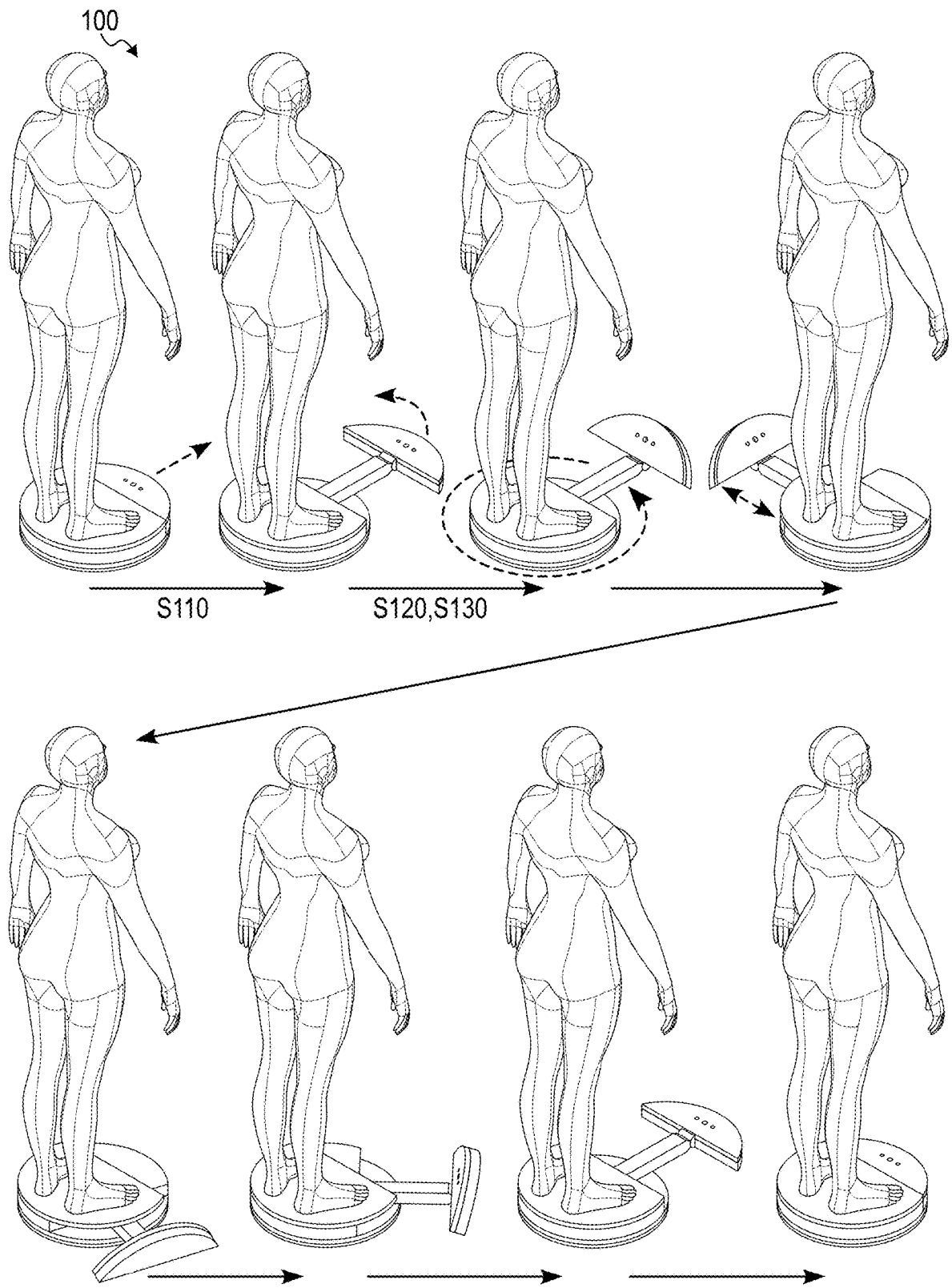
FIG. 6 is a flowchart representation of one variation of the method.

In another example shown in FIG. 6, the scanning system can drive the actuation system to sweep the sensor block: from a low pitch angle to locate the user's feet near the centers of the fields of view of the depth sensor and the color camera; to a high pitch angle to locate the user's head near the centers of the fields of view of the depth sensor and the color camera. In the foregoing example, as the actuation system raises the sensor block toward its maximum height of two meters (or as the controller detects the user's head in depth images or color images recorded by the depth sensor or the color camera in near real-time during the scan cycle), the actuation system can pitch the sensor block downward, thereby enabling the depth sensor and the color camera to record depth images and color images, respectively, of the top of the user's head. In another example, the actuation system can drive the sensor block from an initial height proximal the platform to a maximum height one meter above the platform while rotating the boom about the vertical axis through the platform and holding the sensor block at a contact pitch angle, thereby sweeping the sensor block through a path. In this example, once the sensor block reaches the maximum height, the actuation system can slowly pitch the sensor block upwardly toward the user's head while continuing to rotate the boom about the vertical axis, thereby limiting the maximum height of the scanning system during this scan cycle while also enabling the depth sensor and the color camera to capture scan data of the user's upper torso and head. However, the scanning system can sweep the sensor block along a path of any other geometry during a scan cycle.

Figure 7:
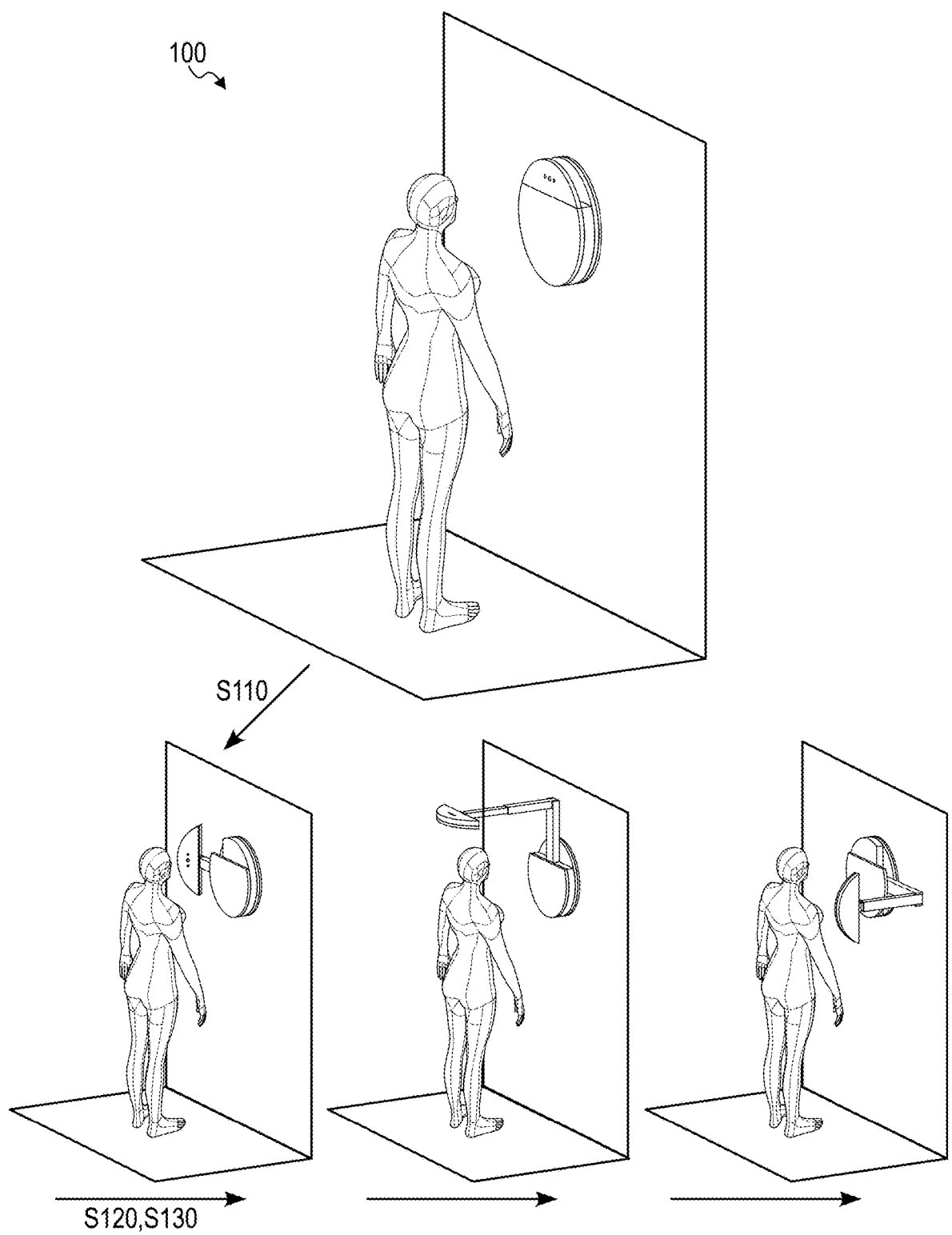
FIG. 7 is a flowchart representation of one variation of the method.

(In another example shown in FIG. 7, the scanning system is mounted horizontally on a wall and sweeps the sensor block around a user's head during a scan cycle. The remote computer system or the local computing device can then implement methods and techniques described below to transform depth images and color images recorded during this scan cycle into a 3D color, texturized model of the user's head or face more specifically.)

4.1 Predefined Waypoints

In one implementation shown in FIG. 1, the scanning system drives the sensor block through a predefined sequence of waypoints and records a depth image at each waypoint in this sequence during the first scan cycle. In this implementation, each waypoint can define a combination of azimuth, altitude, and pitch positions of the sensor block. When the sensor block occupies an azimuth, altitude, and pitch position defined by waypoints in this sequence, the field of view of the depth sensor can: overlap the field of view of the depth sensor when occupying a preceding waypoint by more than a minimum degree of overlap (e.g., 50%); and overlap the field of view the depth sensor when occupying another waypoint—one altitude level down—by more than a minimum degree of overlap. More specifically, the predefined sequence of waypoints can define a high density of positions for depth image capture around the user such that depth images recorded during this first scan cycle contain data overlap spatially by a minimum proportion (e.g., 50%), thereby ensuring that these depth images contain sufficient point density for proper alignment between adjacent depth images and thus enabling the remote computer system to subsequently align these depth images with high precision, verify that this alignment exhibits minimum error, and thus generate a high-accuracy, high-resolution 3D model of the user from these data.

For example, the sequence of waypoints can define azimuth, altitude, and pitch offsets between consecutive waypoints that correspond: to a target lateral overlap of 50%—at a plane intersecting the vertical axis of the platform—between laterally-adjacent depth images recorded at two consecutive waypoints along the path; and a target vertical overlap of 50%—at the plane intersecting the vertical axis of the platform—between two depth images recorded at (approximately) the same azimuthal position during two consecutive rotations of the boom. In another example, the sequence of waypoints can define azimuth, altitude, and pitch offsets between consecutive waypoints predicted to yield: a target lateral overlap of 40%—at a plane offset from the vertical axis of the platform toward the sensor block by a distance of 250 millimeters (e.g., an average maximum radius of a human body)—between laterally-adjacent depth images recorded at two consecutive waypoints along the path.

Thus, in this implementation, the scanning system can implement closed-loop controls—based on position, linear acceleration, and/or angular velocity measurements output by sensors in the scanning system—to step the sensor block through consecutive waypoints or to continuously sweep the sensor block through this sequence of waypoints. When the sensor block occupies (or falls very near) each of these waypoints, the scanning system can trigger the depth sensor to record a depth image and trigger the color camera to record a corresponding color image. The scanning system can also tag each of these depth images and color images with: a timestamp; a waypoint identifier; a scan cycle identifier; actual azimuth and altitude positions of the sensor block when these data were collected; and/or concurrent linear acceleration and angular velocity values output by the IMU when these data were collected; etc.

4.2 Free Record

In another implementation, the scanning system: sweeps the sensor block (approximately) along a path, such as a helical path rising around the user standing on the platform; and triggers the depth sensor and color camera to record depth image and color image pairs at a regular interval during this scan cycle, such as at a constant preset frequency (e.g., 30 Hz) or at a frequency proportional to an angular speed of the sensor block.

In this implementation, the computer system can tag each of these depth images and color images with: a timestamp; a scan cycle identifier; actual azimuth and altitude positions of the sensor block when these data were collected; and/or concurrent linear acceleration and angular velocity values output by the IMU when these data were collected; etc. Later, the scanning system (or the remote computer system, etc.) can define a sequence of waypoints for a next scan cycle with the user at the scanning system based on these metadata. In particular, dynamic characteristics of a sensor block at the end of a boom within a unit of the scanning system may be sensitive to manufacturing tolerances at joints in the boom, calibration of actuator and sensors in the actuation system, and small variation in weight of the sensor block such that motion and oscillation of sensor blocks in multiple units of the scanning system differ significantly when driven along identical target paths. Therefore, (an instance of) the scanning system can: drive the sensor block along a path (e.g., a helical path) during a first scan cycle; record a sequence of depth images and color images at unplanned locations along this path; and record metadata for positions, orientations, and motion of the sensor block when each of these depth image and color image pairs were recorded, which may capture unique dynamic characteristics of the sensor block. Later, the computer system generates a set of transforms that align these depth images and then implements these transforms to construct a 3D color model of the user from a subset of these depth image and color image pairs based on these transforms, as described below. The computer system (or the scanning system, the local computing device) can then also: retrieve azimuth and altitude positions of the sensor block stored in each depth image in this subset of depth images; generate a waypoint for each of these depth images based on these azimuth and altitude position data; define an order for these waypoints; and store these waypoints in association with the user and/or the scanning system. Later, the scanning system can implement closed-loop controls—as described above—to drive the sensor block to each waypoint in this sequence and to record depth image and color image pairs at each of these waypoints during a next scan cycle.

Therefore, the scanning system and the computer system can implement this process to calibrate a set of waypoints to dynamic characteristics of the scanning system based on a "free scan" process during the first scan cycle at the scanning system. The scanning system can then execute this calibrated set of waypoints during later scan cycles to capture scan data of the user, which may leverage natural dynamic characteristics of the scanning system to capture scan data at highly-consistent locations and reduce spatial error between capture positions between the first scan cycle and later scan cycles. Because capture positions in these later scan cycles may exhibit high spatial similarity to (many or all of) the capture positions executed in the first scan cycle, the local computing device (or the remote computer system) can implement the same transforms generated for scan data collected during the first scan cycle to initialize alignment of scan data collected during these later scan cycles.

However, the scanning system can implement any other control and data capture schema during the first scan cycle.

4.3 Adaptive Scan Parameters: User Height

In one variation, the scanning system can adjust the path of the sensor block during the first scan cycle based on the user's height.

In one implementation, the scanning system: drives the depth sensor along a first, predefined path in Block S120; records a first sequence of depth images and a first sequence of color images along the first path; implements computer vision techniques (e.g., template matching, object detection) to detect a lower leg feature (e.g., a knee) offset above the platform in the first subset of depth images and/or in the first sequence of color images; predicts a height of the user based on a height of the lower leg feature above the platform (e.g., a distance from a center of the knee to a top position of the platform below); and then calculates a second path that extends between the end of the first path and a target distance (e.g., 20 centimeters) above the predicted height of the user. Upon completion of the first, predefined path, the scanning system can transition to: driving the depth sensor along the second path in Block S120; and recording a second sequence of depth images and a second sequence of color images along the second path in Block S130.

Therefore, in this implementation, the scanning system can sweep the sensor block upward from proximal the user's feet, estimate the user's height based on data collected early in this scan cycle, and then modify the remainder of the path of the sensor block in real-time based on the user's predicted height—such as by refining or regenerating a sequence of waypoints for this scan cycle—such that top of the user's head is captured during this scan cycle while also minimizing a total duration of the scan cycle and a total number of depth images and color images captured during this scan cycle. Thus, in this implementation, the scanning system can modify the path of the sensor block in order to match the length and height of the path of the sensor block to the user's anatomy, thereby eliminating capture positions in which depth images and color images above the user would otherwise have been recorded during the scan cycle, improving convenience of the scan cycle for the user, necessitating less computational load to transform these scan data into a 3D model, reducing bandwidth requirements for offloading these scan data from the scanning system to the remote computer system, and necessitating less data storage for the 3D model and related scan data.

Alternatively, a user portal within the native application or web browser executing on the user's local computing device can prompt the user to enter her height, and the computing device, the remote computer system, or the scanning system can implement similar methods and techniques to automatically adjust the path of the sensor block for the first scan cycle based on the height entered manually by the user.

Furthermore, the scanning system, computing device, or remote computer system can store this path customized for the user for the first computer system, such as in the form of a sequence of waypoints; the scanning system can later access and execute this path during a next scan cycle with the user, as described below.

4.4 Adaptive Scan Parameters: User Weight

In a similar variation, the scanning system can adjust the path of the sensor block during the first scan cycle based on the user's predicted anatomy.

In one implementation, the scanning system samples the load cell under the platform and records a weight of the user based on an output of the load cell. The scanning system then predicts a maximum width of the user based on the user's weight. For example, the scanning system can: access or estimate a height of the user, as described above; and enter the weight of the user and the height of the user in a human anatomy model to estimate a geometry or maximum width of the user. The scanning system can then set a radial offset of the sensor block from the vertical axis of the platform proportional to the predicted maximum width of the user. In particular, the scanning system can: predict the maximum width of the user proportional to the user's weight and inversely proportional to the user's height; set a target radial distance of the sensor block offset radially outwardly from the maximum predicted width of the user by a threshold distance; and then adjust a length of the horizontal segment of the boom—via the actuator system—to this target radial distance before or during the first scan cycle. For example, the scanning system can set the target radial distance of the sensor block offset radially outwardly from the maximum predicted width of the user by a threshold distance of 25 centimeters such that the maximum width of the user (e.g., the user's shoulders, the user's lower torso) is predicted to fill 90% of the width of the field of view of the depth sensor and color camera at one capture position during this scan cycle.

The scanning system can then adjust waypoints, sensor block speed, or sampling frequency of the depth sensor and the color camera in order to achieve a minimum overlap between adjacent depth images and between adjacent color images during this scan cycle, as described above.

5. User Movement

In another variation, the scanning system can detect motion of the user during the first scan cycle and selectively pause the scan cycle, repeat segments of the scan cycle, or serve motion-related prompts to the user responsive to such detected motion. In particular, motion of the user during the first scan cycle may not be repeated or reproducible during a later scan cycle. Therefore, while the remote computer system may calculate transforms that align scan depth images from this first scan cycle in which the user exhibits some motion and then generate a first 3D model of the user based on these transforms, this first set of transforms generated according to scan data from the first scan cycle may greater yield error for initial alignment of depth images recorded during a second, later scan cycle due to differences in motion of the user between the first and second scan cycles. Furthermore, excessive motion of the user during the first scan cycle may introduce error sufficient to prevent the remote computer system from converging on a solution to compile this first sequence of depth images and thus prevent the remote computer system from generating a 3D model of the user from these scan data. The scanning system can therefore track and automatically respond to user motion during the first scan cycle.

5.1 User Movement: Weight Shift

In one implementation, the scanning system samples the load cell and predicts user motion—while occupying the platform above—proportional to magnitude of changes in load detected by the load cell. In this implementation, if the scanning system thus detects an absolute or relative change in load on the platform that exceeds a high threshold change—which may correspond to a significant change in position or pose of the user—the scanning system can automatically restart the scan cycle. Similarly, if the scanning system detects an absolute or relative change in load on the platform that falls between a moderate threshold and the high threshold, the scanning system can pause the scan cycle and then resume the scan cycle once load on the platform returns to a steady-state. Furthermore, if the scanning system detects an absolute or relative change in load on the platform that falls between the threshold and the low threshold, the scanning system can: continue to execute the scan cycle; but output an audible tone to prompt the user to remain still or interface with the local computing device to serve a notification to remain still to the user.

5.2 User Movement: Optical Flow

In another implementation, the scanning system can implement optical flow techniques to detect motion of objects (i.e., the user) in the sequence of color images recorded by the color camera during the first scan cycle. For example, as the scanning system sweeps the sensor block around the user, optical flow from consecutive color images recorded by the color camera may be a function of (e.g., proportional to) known, controlled changes in the azimuth, altitude, and pitch positions of the color camera between these consecutive color images if the user is substantially static (i.e., not moving). For example, as the scanning system drives the color camera through a sequence of azimuth, altitude, and pitch positions at consistent speed during this scan cycle, optical flow may be null or very low from between consecutive color images recorded by the color camera during this scan cycle if the user is not moving. However, optical flow between consecutive color images may increase as a function of increasing magnitude and/or rate of movements by the user.

Therefore, in this implementation, the scanning system can: detect a region in a color image depicting a portion of the user (e.g., by scanning laterally from a center of the color image to first edges to the left and right of the center column of pixels in the color image); crop the color image around the region depicting the user; repeat this process for each subsequent color image recorded by the scanning system to generate a live sequence of cropped color images depicting portions of the user; and implement optical flow techniques to characterize user motion based on changes between these cropped color images in (near) real-time. If the motion of the user exceeds a threshold, the scanning system can restart the scan cycle, pause the scan cycle, and/or prompt the user to remain still during the remainder of the computer system, such as described above.

However, the scanning system can implement any other method or technique to detect and respond to user motion during the first scan cycle. Furthermore, the local computing device can access scan data recorded by the scanning system and execute similar methods and techniques—rather than the scanning system—to respond to user motion in (near) real-time based on these scan data.

5.3 User Movement: Preemptive Prompts

In this variation, the scanning system (or the local computing device) can also selectively serve preemptive prompts to remain still to the user as the scanning system prepares to scan high-interest regions of the user's body during the first scan cycle, such as the user's face and buttocks. By thus selectively prompting the user to remain more still during these select periods of the scan cycle, the scanning system can collect scan data than may enable the remote computer system to generate a 3D color model that depicts these areas of interest on the user with greater spatial accuracy and smoother, more accurate transitions between color patches.

In one example, the scanning system (or the local computing device, the remote computer system) can: implement computer vision techniques in real-time to detect regions of the user's body in recent color images recorded by the color camera; and then output an audible tone to prompt the user to remain still when the scanning system determines that the sensor block is facing the user's upper thigh—and therefore approaching the user's buttocks. The scanning system can again output an audible tone to prompt the user to remain still with her eyes open when the scanning system determines that the sensor block is facing the user's upper torso or neck—and therefore approaching the user's face. In another example, the scanning system can predict the proximity of the sensor block to areas of interest on the user based on the position of the sensor block and a predicted geometry of the user—such as based on the user's height, as described.

In this variation, the local computing device can additionally or alternatively output audible prompts or render textual notifications—for user stillness—synchronized to the position of the sensor block relative to areas of interest on the user during this scan cycle. However, the scanning system, the local computing device, and/or the remote computer system can implement any other method or technique to selectively prompt the user to remain still during the first scan cycle.

6. Data Offload

During the scan cycle, the scanning system can automatically upload depth images to the remote computer system in real-time as the depth images are recorded, such as directly via a local wireless area network or through the user's local computing device via a local ad hoc wireless network. Alternatively, the scanning system can offload these depth images to the remote computer system for processing en masse upon conclusion of the first scan cycle.

Furthermore, the scanning system can upload depth images to the remote computer system first, followed by color images from the scan cycle. Upon receipt, the remote computer system can process these depth images first to construct a 3D model of the user's body in Blocks S140 and S150 while the scanning system uploads corresponding color images. Upon completion of the 3D model of the user, the remote computer system can extract color patches for the 3D model from these color images, thereby limiting delay between recordation of these scan data, generation of the 3D model of the user, colorization of the 3D model, and presentation of a 3D color model to the user at the user's local computing device after completion of the scan cycle.

However, the scanning system can return these depth images and color images to the remote computer system in any other way and according to any other schema during or upon conclusion of the scan cycle.

7. Reconstruction into 3D Model

Blocks S140 and S150 of the method S100 recite calculating a first set of transforms that align the first sequence of depth images and compiling the first sequence of depth images according to the first set of transforms to generate a first 3D model of the user for the first time, respectively. Generally, in Blocks S140 and S150, the remote computer system process depth images recorded by the scanning system during the first scan cycle; to converge on a set of transforms that align these depth images with minimum spatial error between surfaces represented by surfaces in these depth images; and to leverage this set of transforms to compile these depth images into a 3D model of the user, such as in the form of a 3D mesh that can then be colorized to form a hyper-realistic, color-true, texture true representation of the user, as shown in FIG. 8.

In one implementation, the remote computer system: projects the first sequence of depth images recorded during the first scan cycle into a virtual 3D space to form a first set of point clouds; and coarsely aligns these point clouds based on actual or target azimuthal, altitude, and pitch positions of the sensor block (or the depth sensor more specifically) when each of these depth images was recorded. The remote computer system can then implement iterative closest point (or "ICP") techniques to: subsample points in these point clouds; characterize error between selected points in these point clouds; and shift relative positions of vertically-overlapping and horizontally-overlapping point clouds in the virtual 3D space to minimize error between these points. The remote computer system can then store positions of these point clouds that minimize error between points in the form of a first set of transforms. The computer system can then apply the first set of transforms to corresponding point clouds to generate a composite 3D point cloud in the virtual 3D space.

The remote computer system can then: implement smooth signed distance, fast-four transform, or Poisson surface reconstruction techniques to transform the composite 3D point cloud into a mesh representing the surface of the user; and store this mesh as a (colorless, pre-color) 3D model of the user in Block S150.

7.1 Variation: Photogrammetry

Alternately, the remote computer system can implement photogrammetry or structure from motion techniques to compile the first sequence of 2D color images recorded during the first scan cycle into a 3D point cloud based on known changes in position, changes in orientation, linear acceleration, and/or angular velocity of the color camera between recordation of these color images. In this implementation, once the remote computer system has generated a 3D point cloud from these color data, the remote computer system can: calculate a set of transforms that minimizes spatial error between points in the first sequence of depth images and surfaces defined in the color-image-derived 3D point cloud; leverage this set of transforms to compile these depth images into a depth-derived 3D point cloud of the user; and then calculate a surface mesh representation of the user from this depth-derived 3D point cloud. The remote computer system can later leverage this set of transforms to move between the domain of the color camera and the domain of the depth sensor for scan data collected both during this first scan cycle and during later scan cycles.

Alternatively, the scanning system can record color images exclusively during the first scan cycle. The remote computer system can then: implement photogrammetry or similar techniques to construct a 3D point cloud of the user; generate and store a set of transforms that define positions of these color images that minimize error between adjacent color images; and calculate a surface mesh representation of the user from this color-derived 3D point cloud. Later, the local computing device can leverage these transforms and (basic, lower-cost) photogrammetry techniques to construct a second color-derived 3D point cloud and a second surface mesh representation of the user from this second sequence of color images recorded by the scanning system during a next scan cycle.

In another variation, the scanning system implements photometric techniques to illuminate the user with artificial light (e.g., with an LED integrated into the sensor block) and to record multiple color images of the user with different lighting patterns per waypoint along the scan path during a scan cycle. The scanning system (or the remote computer system) can then compile a set of color images recorded at each waypoint to 3D information of the user from the perspective of the camera at this waypoint, such as including high-resolution texture information. The scanning system (or the remote computer system) can repeat this process for color images recorded at each other waypoint and compile the resulting 3D information into a 3D (texturized) representation of the user.

However, the remote computer system can implement any other method or technique to generate a 3D model of the user based on depth images and/or color images recorded during the first scan cycle.

8. Reconstructing Color

One variation of the method S100 shown in FIGS. 1A and 8 includes Blocks S110 and S172, which recite: extracting a first set of color patches, from the first sequence of color images, corresponding to a set of discrete regions on a surface of the first 3D model of the user; and projecting the first set of color patches onto the surface of the first 3D model to generate a first 3D color model of the user. Generally, in Blocks S110 and S172, the remote computer system can extract color patches from (a small subset of) the first sequence of color images recorded during the first scan cycle; the remote computer system or the local computing device can then render these color patches on the surface of the 3D model (e.g., the surface of low-density mesh of the user-facing model described below) to generate a realistic, color-true 3D color model of the user. The local computing device can then display this 3D color model for the user.

In one implementation, the remote computer system identifies a set of discrete regions on the surface of the 3D model, wherein each region in this set approximates a plane (e.g., contains points or defines mesh nodes that fall near a plane) and defines a contiguous surface exceeding a minimum surface area (e.g., 1,000 square millimeters). For each region in this set of discrete regions, the remote computer system can: identify a particular color image—in the first sequence of color images recorded during the first scan cycle—depicting an area on the user that corresponds to this region on the surface of the 3D model; project a boundary of this region onto the particular color image; crop the color image around this projected boundary to define a color patch for this region on the surface of the 3D model; write a coordinate of this region—within a coordinate system defined in the first 3D model—to the color patch; and store this color patch in a first set of color patches for the first scan cycle. The remote computer system can repeat this process for each other region thus defined on the surface of the 3D model. Later, the remote computer system or the local computing device can: access this first set of color patches and the corresponding first 3D model for the first scan cycle; and project the first set of color patches onto the surface of the first 3D model based on coordinates assigned to these color patches and the coordinate system of the first 3D model to render a 3D color model depicting the user during the first scan cycle. The local computing device can then display this 3D color model for the user.

8.1 Region Selection

In this implementation, the remote computer system can select regions on the 3D surface for allocation of a 2D color patch based on planarity of these regions, as shown in FIG. 8. For example, after generating the 3D model, the remote computer system can implement plane detected techniques to scan the surface of the 3D model for regions approximating planes, such as contiguous regions: containing points or defining surface profiles that fall within a threshold distance (e.g., +/−10 millimeters) of a plane; and defining contiguous areas greater than a minimum area (e.g., 1,000 square millimeters).

Alternately, the computer system can: prioritize larger regions over small regions in order to minimize seams between corresponding color patches rendered on the 3D model (which may minimize quantity of color patches for the 3D model and limit graphics processing time to render the resulting 3D color model); prioritize regions exhibiting less error or deviation from best-fit planes (which may minimize error resulting from projection of 2D color patches onto 3D surfaces in the 3D model); and then calculate a set of regions of that balance maximum region size and minimum deviation from planarity.

8.3 Preset Seam Locations

In one variation, the remote computer system implements or approximates preset seam locations between discrete regions isolated within the 3D model, such as: vertical seams extending from waistline to armpit along left and right flanks of the 3D model; a lateral seam along the waistline or base of the torso in the 3D model; seams extending from jawline to behind the ear on each side of the head in the 3D model, etc.

In one implementation, the remote computer system: accesses a generic human body model defining a preset color patch boundary along a flank of the generic human body model; deforms the generic human body model into alignment with the first 3D model; transfers the preset color patch boundary from the generic human body model onto the first 3D model; and then implements methods and techniques described above to define a boundary between two adjacent discrete regions proximal this preset color patch boundary in the first 3D model. The remote computer system can thus inject one or many preset color patch boundaries from the generic human body model into the 3D model and then segment the 3D model into multiple discrete regions based on these preset color patch boundaries. For example, the remote computer system can define a set of regions—across the entire surface of the 3D model—that minimizes a cost between largest regions, most-planar regions, and proximity of region boundaries to preset color patch boundaries. Alternatively, the remote computer system can snap region boundaries directly onto closest preset color patch boundaries.

However, the remote computer system can segment the surface of the 3D model in any other way and according to any other parameters.

8.4 3D Space to Color Space

The remote computer system can then extract a color patch from a 2D color model for each discrete region thus defined on the surface of the 3D model.

For example, for each region thus isolated on the surface of the 3D model, the remote computer system can: calculate a centroid of the region; calculate a target sensor block position—at the scanning system—that locates the focal axis of the color camera at a point on the user corresponding to the location of this centroid on the 3D model; and then retrieve a particular color image—from the first sequence of color images—recorded by the color camera when the sensor block occupied an actual position nearest this target position during the first scan cycle. The remote computer system can then locate this particular 2D color image with the 3D model based on this actual position of the sensor block when the particular color image was recorded and a fixed, known offset between the color camera and depth sensor. For example, the remote computer system can: retrieve a particular transform that aligned a concurrent depth image—recorded by the depth sensor when the sensor block occupied the same target position during the first scan cycle—with other depth images in the 3D model; apply the particular transform to the particular color image to locate the color image relative to the 3D model; and adjust (or "correct" the position of the particular color image relative to the 3D model based on a known offset between the color camera and the depth sensor, such as defined in a static, stored sensor transform. The remote computer system can then: project a boundary of the particular region on the 3D model onto the particular color image; crop the color image around the 2D boundary; and store this cropped area of the color image as a color patch for this region on the surface of the 3D model. The remote computer system can repeat this process for each other region on the surface of the 3D model to generate a complete set of patches for the 3D model.

However, the remote computer system can implement any other method or technique to generate a color patch for a region on the surface of the 3D model.

9. Texture

In one variation as shown in FIG. 8, the remote computer system further augments the first 3D model of the user with texture information in Block S174.

9.1 2D Bump Map

In one implementation shown in FIG. 6, the remote computer system scans a color patch—in the first set of color patches for the first 3D model—for a field depicting a homogeneous color pattern, such as a field containing pixels of substantially uniform distribution of similar color blobs, depicting similar edge features, and/or depicting substantially uniform distribution of these similar edge features. The remote computer system can then implement deep learning, artificial intelligence, template matching or other computer vision techniques to predict a texture type depicted in the field based on this homogeneous color pattern, such as by matching features extracted from the field in the color patch to stored template features for one of: loose skin; tight or smooth skin; wrinkle skin; lip tissue; eyes; hair (and different types of hair, such as straight, wavy, curly, and kinky hair types); fingernails; acne; acne scarring; cellulitis; and clothing. Accordingly, the remote computer system can retrieve a texture model—from a set of predefined texture models characterizing various texture types—for the identified texture type depicted in the field. For example, the texture model can include a 2D bump map, and the remote computer system can combine this 2D bump map with the corresponding field in the 2D color patch, such as by projecting this 2D bump map onto the corresponding field or by rendering this 2D bump map within this field in the 2D color patch. In this implementation, the remote computer system can repeat this process to inject texture data into other fields depicting other texture types in this color patch, and the remote computer system can repeat this process for each other color patch associated with the first 3D model. Later, the local computing device (or the remote computer system) can render these texturized color patches over their assigned regions on the surface of the 3D model of the user to generate the 3D color, texturized model of the user.

Alternatively, the remote computer system can: generate a separate 2D texture patch spanning the boundary of the field in the 2D color patch; inject the 2D bump map from the texture module into the 2D texture patch. In this implementation, the remote computer system can repeat this process to generate texture patches for fields depicting other texture types in this color patch and for such texture fields in each other color patch associated with the first 3D model. Later, the local computing device (or the remote computer system) can render both these color patches and texture patches over their assigned regions on the surface of the 3D model of the user to generate the 3D color, texturized model of the user.

9.2 3D Texture Function

In another implementation, the remote computer system implements methods and techniques described above: to scan a color patch—in the first set of color patches for the first 3D model—for a field depicting an homogeneous color pattern and to predict a texture type of the field based on the homogeneous color pattern. In this implementation, the remote computer system then: retrieves a texture model— for this texture type of the field in the form of a mathematical function (e.g., a mathematical function characteristic of a 2D bump map for this same texture); implements methods and techniques described below to locate the color patch on the corresponding region on the surface of the 3D model; transfers a boundary around the field in the projected color patch onto the surface of the 3D model to define a texture boundary for this texture type; and then deforms a region on the surface of the first 3D model—contained within this texture boundary—according to the mathematical function. For example, the remote computer system can generate an isosurface based on this mathematical function and merge (or "fuse") this isosurface with the corresponding region on the surface of the 3D model.

Therefore, in this implementation, the remote computer system can locally deform the surface of the 3D model (e.g., the low-density 3D mesh described below) to reflect the texture detected in the corresponding area on the color patch. The remote computer system can repeat this process for the same and other textures detected in other areas through the first set of color patches.

9.3 Texture Magnitude

In this variation, the remote computer system can also extract a magnitude of a texture from a color patch. For example, the remote computer system can adjust a texture model projected onto a field in a patch or incorporated into the surface of the 3D model to reflect: density and depth of wrinkles; thickness of hair; distribution of cellulitis; and/or smoothness of skin.

In one implementation, after detecting a primary texture type within a field within a color patch, the remote controller can: extract an intensity gradient of the texture type from the field in the color patch; retrieve a texture model for this texture type in the form of a bump map; and then project this bump map across the field in the color patch as a function of the intensity gradient for the texture type in the field, such as by setting an opacity or scale of features in the projected bump map proportional to intensity values stored in the intensity gradient. In another example, the remote computer system can: access a database of texture models, including texture models depicting the same texture type at different intensities or magnitudes; retrieve a particular bump map corresponding to the texture type detected within a field of a color patch and depicting this texture type at a magnitude nearest the magnitude detected in the field; and then inject this texture model across the corresponding field in the color patch.

Alternately, in the implementation described above in which the remote computer system adjusts the surface of the 3D model to reflect a texture type detected in a corresponding field in a color patch, the remote computer system can: extract an intensity gradient of the texture type in the field in the color patch; generate an isosurface based on the mathematical function with coefficients of the mathematical function adjusted based on values in the intensity gradient such that the isosurface reflects spatial intensity of this texture type on the user's body; and then fuse this isosurface with the corresponding region on the surface of the 3D model.

9.4 Selective Texturing

In the foregoing implementations, the remote computer system can also selectively texturize regions on the surface of the 3D model in order to reduce processing and rendering time for texture on the 3D model while ensuring that texture is accurately detected in common areas of interest on the 3D model, such as the user's face, stomach, and buttocks.

10. Variation: Backend and User-Facing 3D Models

In one variation shown in FIGS. 8 and 9, the remote computer system can implement smooth signed distance, fast-four transform, or Poisson surface reconstruction techniques: to generate a high-density 3D mesh in Block S160; and to generate a low-density 3D mesh in Block S150, which may lose spatial resolution over the high-density 3D mesh but require less graphics load or processing to render than the high-density 3D mesh. The remote computer system can then generate a set of color patches and texture map for the low-density 3D mesh, as described above. The user's local computing device can access these color patches, texture map, and low-density 3D mesh, render the color patches and texture map over the surface defined by the low-density 3D mesh to generate a user-facing 3D color model of the user, display this user-facing 3D color model for the user, and receive dimension queries over the user-facing 3D color model from the user in Block S180. Separately, the remote computer system can: store the high-density 3D mesh as a backend 3D model of the user; project dimension queries received on the user-facing 3D color model onto the backend 3D model; extract dimensional values for these queries from this higher-accuracy backend 3D model in Block S182; and then return these dimensional values to the local computing device for presentation to the user. Thus, by generating a user-facing 3D model containing a lower-density mesh and a backend 3D model containing a higher-density mesh in Blocks S150 and S160, the remote computer system can enable a 3D color model of the user to be rendered relatively quickly at a local computing device (or pre-rendered relatively quickly by the remote computer system) and thus reduce user wait time after the first scan cycle while also preserving high spatial accuracy in a representation of the user thus generated from scan data collected during the first scan cycle.

Therefore, in this variation, the remote computer system can: generate a user-facing 3D model—including a lower-density mesh paired with color patches and/or texture data—for presentation to the user (or affiliated entity, such as an athletic coach, trainer, therapist, or physician) in Blocks S150 and S152; and generate a backend 3D model—including a higher-density mesh and absent color and texture data—for extraction of high-precision measurement based on the same scan data collected during the first scan cycle.

The remote computer system can therefore store the user-facing 3D model paired with the concurrent backend 3D model.

10.1 Dimension Extraction from Backend 3D Model

The remote computer system can also: serve the user-facing 3D model to a local computing device for rendering and display for the user (or an affiliated entity); receive the corresponding backend 3D model when the user-facing 3D model is open at the local computing device; and then extract measurements from the backend 3D model based on selection made on the user-facing 3D model.

In one implementation shown in FIG. 9, the local computing device: accesses the first user-facing 3D model—including the first low-density mesh and the first set of texturized color patches—once generated by the remote computer system following completion of the first scan cycle; renders the first set of texturized color patches on the surface of the low-density mesh to generate a first 3D color model of the user; and then displays the first 3D color model on a connected or integrated display. The local computing device can then receive selection of a dimension on the first 3D color model, such as: a width of the waist; a circumference of the waist; a width of the shoulders; a circumference of a neck; a total height; an inseam length; a foot length; or a bicep circumference; etc. For example, the local computing device can highlight these common corporeal measurements—such as by deforming a generic common human dimension model onto the 3D color model, transferring common corporeal measurements from the generic common human dimension model onto the 3D color model, and prompting the user to select from these common corporeal measurements—and then record selection of a common corporeal measurement from this set. Alternatively, the local computing device can record selection of two pixels or mesh nodes or selection of a surface profile on the 3D color model. The local computing device can return this dimension selection to the remote computer system, which can then: transfer this dimension selection (e.g., the common corporeal measurement, the selected pixels or nodes, or the surface profile) onto the backend model; extract a value of this dimension—thus projected from the user-facing 3D color model onto the backend 3D model—such as in the form of a distance between two points, a length, an area, a volume, or a surface profile; and then return this extracted value to the local computing device for presentation to the user (e.g., in near real-time).

Therefore, the remote computer system can store both the user-facing 3D model paired with the concurrent backend 3D model, receive measurement queries entered at the user-facing 3D model, transfer measurement queries onto the backend 3D model, extract values for these measurement queries from the backend 3D model, and return these values to the local computing device for presentation with the user-facing 3D model. Thus, the remote computer system and the local computing device can leverage the user-facing and backend 3D model pair to communicate a hyper-realistic, color- and texture-true representation of the user's body to the user (or affiliate) while also preserving access to a high-precision volumetric representation of the user's body, which together may enable the user to rapidly access both a lower-bandwidth, lighter-weight visual representation of the user and high-precision metrics related to the user's body.

11. Preparation for Future Scan

The remote computer system (and/or the scanning system, the local device) can aggregate scan cycle, data capture, data processing, and user characteristics and parameters and then store these characteristics and parameters for implementation during execution of a next scan and processing of resulting scan data into a next 3D color model of the user.

For example and as shown in FIG. 8, the remote computer system can generate a scan file containing: data capture positions (or "waypoints") of the sensor block in the scanning system at which each depth image contained in the first 3D model of the user and at which each color image containing a color patch in the first set of color patches was recorded during the first scan cycle; a first set of transforms for compiling a subset of depth images in the first sequence of depth images into a user-facing 3D model with low mesh density; (a second set of transforms for compiling the same or other subset of depth images in the first sequence of depth images into a backend 3D model with high mesh density;) color image capture positions, crop areas, and coordinates for color patches in the first set of color patches; and locations, texture types, and texture magnitudes for textures in fields in color patches or on regions of the 3D color model. The remote computer system can then associate this scan file with the user, such as with the user's profile (e.g., a unique identifier assigned to the user), the measured weight of the user during the first scan cycle, the user's lower leg features detected by the scanning system during the first scan cycle, or the user's facial features detected by the scanning system during the first scan cycle.

However, the remote computer system (or the scanning system, the local computing device) can aggregate and store any other data related to the user, the first scan cycle, and/or the first 3D color model based on data collected during the first scan cycle.

12. Next Scan and Next 3D Model

During a next scan cycle, the scanning system and the local computing device (and/or the remote computer system) can leverage these stored data from the first scan cycle to simplify the next scan cycle and/or generate a second 3D model of the user in less time and/or with less computational load.

12.1 Scan Parameters

In one implementation, the user logs in to the scanning system or to her user profile at a user portal within a native application or web browser executing on her computing device in order to initiate a new scan cycle (e.g., a second scan cycle) at the scanning system. The scanning system or the computing device can then retrieve a scan file—associated with the user's profile—generated previously based on data collected during the user's first scan cycle at the scanning system (or at another, similar scanning system). The scanning system can extract a sequence of data capture positions (or "waypoints") from the scan file, initiate a next scan cycle with the user, drive the sensor block through this sequence of data capture positions, and trigger the depth sensor and the color camera to capture depth images and color images at each of these data capture positions.

In another example, during the first scan cycle, the scanning system can: record a first weight of a load (i.e., the user) on the platform; and record azimuth, altitude, and pitch positions occupied by the depth sensor during recordation of each depth image in the first sequence of depth images. The remote computer system can then store these waypoints in the scan file for the first scan cycle and link this scan file to the weight of the user. Later, when the same user steps onto the platform to initiate a second scan cycle, the scanning system can: record a second weight of a load on the platform; query a local or remote database for historical weights recorded during past scan cycles at the scanning system; isolate a particular historical weight that differs from the second weight by less than a threshold difference; retrieve a scan file associated with the particular historical weight; extract a first sequence of capture positions stored in the scan file; and then record depth images and color images with the sensor block occupying all or a subset of these capture positions in Blocks S112, S122, and S132.

However, the scanning system can identify the user based on any other identifying feature detected before or during the second scan cycle (e.g., lower leg features, predicted height). The scanning system can then retrieve a scan file for the user or access a sequence of capture positions from the first scan cycle to repeat during this next scan cycle based on the user's identity.

12.2 Reduced Data Capture

In one implementation, the remote computer system populates the scan file with a subset of capture positions executed during the first scan cycle such that a second sequence of depth images and color images recorded by the scanning system during later scan cycles exhibit less overlap (e.g., 5% overlap rather than 50% overlap) but still contain sufficient information to generate additional 3D color models (and backend 3D models) of the same or similar spatial, color, and texture accuracy and with similar mesh densities. In particular, the scanning system can record depth images and color images at a high density of capture positions during the first scan cycle to enable the remote computer system to reconstruct a first high-definition 3D color model of the user without previous understanding of the dynamics of the scanning system or the anatomy of the user. Once the remote computer system has generated this first 3D color model of the user, the remote computer system can filter the sequence of capture positions from the first scan cycle down to a subset of capture positions that, when executed by the scanning system, enable capture of a smaller number of depth images and a smaller number of color images that can be combined according to transforms and color patch definitions from the first scan cycle to complete a new 3D model of the user.

For example, the remote computer system can aggregate an initial list of capture positions corresponding to color images containing every color patch in the first set of color patches. Then, given a depth image recorded at every capture position in the initial list of capture positions, the remote computer system can filter first sequence of capture positions from the first scan cycle down to a second sequence of capture positions that include: the initial list of capture positions; and additional capture positions between the initial list of capture positions that yield a second target overlap (e.g.,5%) of points—depicting the user's body—in adjacent depth images captured at these capture positions given known geometries of regions of the user in the field of view of the depth sensor at these capture positions.

In particular, the sensor block may fall closer to the body of a heavyset user with a large torso circumference such that a small proportion of the circumference of this user's torso falls within the field of view of the depth image at each capture position. Therefore, the remote computer system can define a higher density of capture points around this user's torso in this second sequence of capture positions in order to achieve the target overlap between adjacent depth images during a next scan cycle. Conversely, the sensor block may fall further from the body of a lean user with a small torso circumference such that a large proportion of the circumference of this user's torso falls within the field of view of the depth image at each capture position; therefore, the remote computer system can define a lower density of capture points around this user's torso in this second sequence of capture positions in order to achieve the target overlap between adjacent depth images during a next scan cycle. The remote computer system can similarly define a smaller density of capture positions around the user's feet and head and a larger density of capture positions around the user's torso for both lean and heavyset users. Therefore, the remote computer system can leverage the first 3D model of the user, which depicts the actual anatomy (or "shape") of the user, to select a variable density of capture positions from the first scan cycle to achieve this second target overlap between points—in adjacent depth images—depicting the surface of the user's body.

The remote computer system can then store this second sequence of scan positions in the scan file for the user. During the second scan cycle, the scanning system can thus access this second sequence of capture positions, drive the sensor block through this second sequence of capture positions, and record a depth image and color image pair at each of these second sequence of capture positions. Because this second sequence of capture positions contains a lower number and lower density of capture positions than the first sequence of capture positions completed in the first scan cycle, the scanning system can execute the second scan cycle at greater speed—and therefore in less time—than the first scan cycle. For example, the scanning system can implement closed-loop controls: to sweep the sensor block along a helical path defined by the first sequence of capture positions at a first speed (e.g., 0.2 m/s) during the first scan cycle; and to sweep the sensor block along the same or similar helical path defined by the second sequence of capture positions at a second speed (e.g., 0.5 m/s) during the second scan cycle.

Additionally or alternatively, by capturing depth images and color images at fewer, more targeted capture positions, the scanning system can generate less raw data during the second scan cycle, thereby requiring transfer of less data to the remote computer system or local computing device for processing, reducing bandwidth requirements for a local wireless network connected to the scanning system, reducing data offload time, and reducing processing time for transforming these scan data into a second 3D color model of the user.

12. 3Data Filtering

Alternatively, during the second scan cycle, the scanning system can execute the same path and capture depth images and color images at the same set of capture positions as the first scan cycle. For example, the scanning system can record the actual path traversed by the sensor block during the scan cycle based on position data collected from sensors (e.g., optical encoders) coupled to the actuator system, boom segments, and the sensor block and based on linear acceleration and angular velocity data collected from the IMU during the first scan. The scanning system can then: implement closed-loop controls to reproduce these positions, linear accelerations, and angular velocities of the actuator system, boom segments, and sensor block; and capture depth image and color image pairs at the same capture positions during the second scan cycle.

The scanning system can then access the scan file for the user and offload (e.g., to the local computing device or to the remote computer system) only depth images and color images—recorded during the second scan cycle—tagged with capture positions specified in the user's scan file.

Thus, in this implementation, the scanning system can repeat the path and capture positions of the first scan cycle but selectively offload a subset of depth images exhibiting reduced overlap and color images specifically containing color patches defined in the first 3D color model, thereby requiring transfer of less data to the remote computer system or local computing device for processing, reducing bandwidth requirements for a local wireless network connected to the scanning system, reducing data offload time, and reducing processing time for transforming these scan data into a second 3D color model of the user.

In this implementation, the scanning system (or the local computing device) can also identify the user upon conclusion of the second scan cycle, such as by implementing facial recognition techniques to match facial features detected in a color image recorded near the end of the second scan cycle to facial features depicted in the first 3D color model of the user or in a color image recorded during the first scan cycle with the user in order to unique identify the user. The scanning system can then implement the foregoing methods and techniques to retrieve the scan file associated with this user and to selectively offload depth images and color images specified in the scan file to the local computing device or to the remote computer system for processing. In a similar example, upon conclusion of the second scan, the scanning system can transmit a color image predicted to depicted the face of an occupant standing on the platform to the local computing device, such as via a local or ad hoc wireless network. The local computing device (or the remote computer system) can then identify the user in this color image, retrieve the scan file associated with this user from a remote data, and query the scanning system for a subset of depth images and color images specified in this scan file.

However, in this implementation, the local computing device or the remote computer system can cooperate with the scanning system to access depth images and color images recorded at a subset of target capture positions during the second scan cycle.

12.4 Reduced Processing Complexity

Once the local computing device (or the remote computer system) accesses the second sequence of depth images and color images from the second scan cycle, the local computing device can leverage transforms (e.g., maps, transformation matrices) stored in the user's scan file to generate an initial alignment of these depth images. More specifically, the local computing device (or the remote computer system) can pre-position this second sequence of depth images based on the first set of transforms stored in the scan file in order to reduce initial complexity of aligning these depth images. Once these depth images are prepositioned according to this first set of transforms, the local computing device, the local computing device can locally implement ICP techniques described above to refine these transforms and thus reduce error between surface profiles represented by groups of points in smaller overlapping regions of these depth images.

Once the local computing device converges on a refined set of transforms that minimize error between this second set of depth images, the local computing device can compile these depth images into a second 3D model of the user based on this refined set of transforms. The local computing device can also update transforms stored in the user's scan file to reflect these refined transforms from the second scan cycle, which may enable the local computing device to account for anatomical changes occurring in the user over time when prepositioning depth images recorded during future scan cycles.

The local computing device can also retrieve color patch definitions from the user's scan file and apply these definitions directly to the second sequence of color images to generate a set of color patches (or texturized color patches) for the second 3D model of the user.

For example, the remote computer system can record a first set of coordinates, a first set of crop area definitions, and a first subset of capture positions of color images corresponding to the first set of color patches for the first 3D model of the user. During the second scan cycle, the scanning system can record a second sequence of color images at each capture position in this first subset of capture positions. The local computing device can then: extract a second set of color patches from the second sequence of color images based on the first set of crop area definitions; project the second set of color patches onto a surface of the second 3D model based on the first set of coordinates to generate a second 3D color model of the user; and then display this second 3D color model for the user.

Alternatively, the local computing device can: calculate a difference between the first set of transforms from the first scan cycle and the revised set of transforms from the second scan cycle; shift color patch definitions to reflect this difference based on a known offset between the color camera and depth sensor; and then implement these refined color patch definitions to extract color patches from the second sequence of color images. The local computing device can also update the user's scan file to reflect these refined color patch definitions.

Furthermore, the local computing device can locally implement object recognition, template matching, and/or computer vision techniques to detect fields depicting different textures in these colored patches and to execute processes described above to incorporate 2D features (e.g., bump maps) depicting these detected textures in the second set of color patches or to incorporate 3D features (e.g., isosurfaces) depicting these detected textures in the second 3D model of the user.

12.5 Motion-Based Correction

In one variation, the scanning system implements methods and techniques described above to record actual azimuth, altitude, and pitch positions of the sensor block when depth images and color images were captured during the first scan cycle and during the second scan cycle; the remote computer system can store these actual position data for the first scan cycle into the scan file for the user. Later the local computing device can: detect deviations between the actual position of the sensor block when a particular depth image was recorded during the second scan cycle and the actual position of the sensor block when the corresponding depth image was recorded during the first scan cycle; adjust the transform for this capture position to compensate for (or "counter") this deviation; and repeat the process to correct transforms for other depth images recorded during the second scan cycle before prepositioning these depth images in Block S152. The local computing device can then implement methods and techniques described above to refine alignment of this second sequence of scan cycles.

12.6 Processing Location

Therefore, the scanning system, the local computing device, and the remote computer system can cooperate to configure scanning and model construction parameters for a second scan cycle based on data collected during a first scan cycle in order: reduce latency between completion of the second scan cycle and generation of a 3D color model of the user; reduce computational load to generate the 3D color mode; reduce bandwidth, time, and expense of accessing scan data captured by the scanning system; and/or enable efficient generation of the 3D color model with local, lower-cost computation power of a local computing device. More specifically, the scanning system, the local computing device, and the remote computer system can leverage data generated during construction of the first 3D color model of the user to: reduce time to generate a second 3D color model of the user; reduce time to return the second 3D color model to the user by reducing or eliminating time to upload scan data to the remote computer system and to download the second 3D color model to the local computing device; and reduce cost to generate the second 3D model by eliminating cost of uploading scan data and downloading the completed second 3D color model and by leveraging local compute at the local computing device and/or at the scanning system rather than contracting a remote computer system for processing of these scan data.

For example, the remote computer system can: access a first sequence of depth images and color images recorded by the scanning system during a first scan cycle; calculate a first set of transforms that align surface profiles represented by points in the first sequence of depth images; extract a set of color patches for the first 3D model from the first sequence of color images; and store imaging, reconstruction, and color parameters in a scan file associated with the user. Hours, days, weeks, or months later, the user can initiate a second scan cycle on the same (or similar) scanning system, and the scanning system can record a second sequence of depth images and color images of the user during the second scan cycle. A local computing device (e.g., the user's smartphone or tablet, rather than the remote computer system) can then: access this second sequence of depth images and color images; access a subset of the first set of transforms calculated by the remote computer system for the first scan cycle; compile the second set of depth images according to the subset of the first set of transforms to generate a second 3D model of the user; leverage definitions for the first set of color patches to generate a second set of color patches for the second 3D model of the user; render the second set of color patches on the surface of the second 3D model; and then display the second 3D color model for the user, such as in less than one minute from completion of the second scan cycle.

Furthermore, the local computing device can generate both the second, user-facing 3D color model that contains a low-density mesh and generate a second backend 3D model that contains a high-density mesh based on scan data collected during the second scan cycle. The local computing device can then: display the second, user-facing 3D color model for the user; store or cache the second backend 3D model in local memory; receive selection of a measurement on the second, user-facing 3D color model from the user; query the second backend 3D model—stored in local memory—for a dimension of this measurement; and then display this value for the user. In this implementation, the local computing device can also upload a copy of the second user-facing 3D color model and/or a copy of the second backend 3D model to the remote computer system or a remote database for longer-term storage.

12.6 Processing Location

In one variation, the scanning system executes an abbreviated scan cycle to capture depth images and/or color images at a subset of positions about a target segment of the user's body—such as the user's head, upper arms, waist, or thighs—and to generate a 3D color model of this target body segment (i.e., rather than of the user's entire body), which may reduce duration of the scan cycle and subsequent processing time. The remote computer system (or the scanning system) can also incorporate this new 3D color model of the target body segment into a last complete 3D color model of the user's body before presenting this hybrid 3D color model to the user, thereby enabling the user to view the new 3D color model of the target segment of her body in the context of a complete 3D color model of her body.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for modeling a human body comprising:
  initiating a first scan cycle while a user occupies a scale platform at a first time;
  during the first scan cycle:
    driving a sensor block comprising an optical sensor along a path above the platform and about the user; and
    recording a first sequence of images, via the sensor block, at each capture position in a first sequence of capture positions along the path;
  calculating a first set of computational transforms that align the first sequence of images;
  compiling the first set of images according to the first set of computational transforms to generate a first three-dimensional model of the user for the first time;
  detecting an identifying body feature of the user;
  associating the first three-dimensional model of the user with the identifying body feature;
  initiating a second scan cycle while the user occupies the scale platform at a second time succeeding the first time;
  during the second scan cycle:
    driving the sensor block along the path; and
    recording a second sequence of images, via the sensor block, at each capture position in a second sequence of capture positions along the path;
  responsive to detecting the identifying body feature in the second set of images, compiling the second set of images according to the first set of computational transforms to generate a second three-dimensional model of the user for the second time;
  detecting a difference in an anatomical feature of the user between the first three-dimensional model and the second three-dimensional model;
  generating a visualization of the second three-dimensional model; and
  annotating the second three-dimensional model to indicate the difference.

2. The method of claim 1, further comprising:
  during the first scan cycle:
    recording the first sequence of capture positions, each capture position in the first sequence of capture positions defining azimuth, altitude, and pitch positions occupied by the depth sensor during recordation of an image in the first sequence of images; and
    recording a first weight of a load on the platform;
  associating the first sequence of capture positions with the first weight; and
  during the second scan cycle:
    recording a second weight of a load on the platform;
    in response to second weight differing from the first weight by less than a threshold difference, retrieving the first sequence of capture positions; and
    selecting a subset of capture positions from the first sequence of capture positions to define the second sequence of capture positions.

3. The method of claim 1, further comprising:
  extracting a second set of color patches, from the second sequence of images, corresponding to a set of discrete regions on a surface of the second three-dimensional model of the user; and
  projecting the second set of color patches onto the surface of the second three-dimensional model to generate a second [[3D]] three-dimensional color model of the user.

4. The method of claim 3, further comprising, for a second color patch in the second set of color patches:
  detecting a field depicting a homogeneous color pattern in the second color patch;
  predicting a texture type of the field based on the homogeneous color pattern;
  retrieving a first texture model for the texture type of the field from a set of predefined texture models characterizing a set of texture types, the texture model comprising a 2D bump map; and
  incorporating the texture model into the field in the second color patch.

5. The method of claim 4:
  wherein predicting the texture type of the field comprises identifying the texture type in the field selected from the set of texture types comprising: smooth skin, wrinkled skin, cellulitis, and hair;
  further comprising extracting an intensity gradient of the texture type from the field in the second color patch; and
  wherein incorporating the texture model into the field in the second color patch comprises projecting the texture model across the field in the second color patch according to the intensity gradient.

6. The method of claim 4, wherein:
  generating the visualization of the second three-dimensional model annotated to indicate the difference in the anatomical feature comprises incorporating a second texture model into the field of the second color patch;
  wherein the second color patch is associated with a discrete region of the three-dimensional model associated with the anatomical feature; and
  wherein the second texture model differs from the first texture model incorporated into the field for the second color patch.

7. The method of claim 3, wherein generating the visualization of the second three-dimensional model annotated to indicate the difference in the anatomical feature comprises:
  applying a second color patch of the second set of color patches to a discrete region of the second three-dimensional model associated with the anatomical feature, the second color patch differing from a first color patch of the second set of color patches initially applied to the discrete region of the second three-dimensional model.

8. The method of claim 1, wherein driving the sensor block along the path and recording the first sequence of images during the first scan cycle comprises:
  driving the sensor block along a first helical path;
  recording a first subset of images, in the first sequence of images, along the first helical path;
  detecting a lower leg feature offset above the platform in the first subset of images;
  predicting a height of the user based on a height of the lower leg feature above the platform;
  calculating a second helical path based on the height of the user;
  driving the sensor block along the second helical path; and
  recording a second subset of images, in the first sequence of images, along the second helical path.

9. The method of claim 1, wherein annotating the second three-dimensional model of the user to indicate the difference in the anatomical feature between the first and second scan cycles comprises:
  extracting a first volume of the anatomical feature from the first three-dimensional model;
  extracting a second volume of the anatomical feature from the second three-dimensional model;
  isolating the difference comprising a volumetric difference between the first volume and the second volume; and
  annotating the volumetric difference in the second three-dimensional model.

10. The method of claim 1, wherein annotating the second three-dimensional model of the user to indicate the difference in the anatomical feature between the first and second scan cycles comprises:
  extracting a first circumference of the anatomical feature from the first three-dimensional model;
  extracting a second circumference of the anatomical feature from the second three-dimensional mode;
  calculating the difference comprising a circumferential difference between the first circumference of the anatomical feature and the second circumference of the anatomical feature; and
  labeling the anatomical feature in the second three-dimensional model with the circumferential difference.

11. The method of claim 1 wherein detecting the identifying body feature comprises:
  during the first scan cycle of a first user:
    extracting a first set of facial features of the user from the first set of images; and
    associating the facial features of the user with a profile of the first user; and
  during a second scan cycle of a second user:
    driving the sensor block along a path above the platform and about the second user;
    recording a second sequence of images along the path;
    detecting a second set of facial features of a second user in the second sequence of images; and
    in response to the second set of facial features approximating the first set of facial features:
      identifying the second user as the first user; and
      associating the second sequence of images with the profile of the first user.

12. The method of claim 1, wherein detecting the identifying body feature comprises:
  during the first scan cycle of a first user:
    extracting a first leg feature from the first set of images;
    based on the first leg feature, calculating a first height of the first user; and
    associating the first height of the user with a profile of the first user; and
  in response to a second leg feature detected in a second set of images of a second user indicating a second height matching the first height of the first user:
    identifying the second user as the first user; and
    associating the second sequence of images with the profile of the first user.

13. A method for modeling a human body comprising:
  initiating a first scan cycle while a user occupies a scale platform at a first time;
  during the first scan cycle:
    driving a sensor block comprising an optical sensor along a path above the platform and about the user; and
    recording a first sequence of images, via the sensor block, corresponding to a first sequence of capture positions along the path;
  calculating a first set of computational transforms that align the first sequence of images;
  compiling the first set of images according to the first set of computational transforms to generate a first three-dimensional model of the user for the first time;
  initiating a second scan cycle while the user occupies the scale platform at a second time succeeding the first time;
  during the second scan cycle:
    driving the sensor along the path; and
    recording a second sequence of images, via the sensor, corresponding to a second sequence of capture positions along the path;
  compiling the second set of images according to the first set of computational transforms to generate a second three-dimensional model of the user for the second time;
  detecting a difference in an anatomical feature of the user between the first and second three-dimensional models; and
  generating a visualization of the second three-dimensional model annotated to indicate the difference in the anatomical feature.

14. The method of claim 13, wherein annotating the second three-dimensional model of the user to indicate the difference in the anatomical feature between the first and second scan cycles comprises:
  extracting a first volume of the anatomical feature from the first three-dimensional model;
  extracting a second volume of the anatomical feature from the second three-dimensional model;
  based on the first and second volume, calculating an annotation volume; and
  appending the annotation volume to the second three-dimensional model.

15. The method of claim 13, wherein annotating the second three-dimensional model of the user to indicate the difference in the anatomical feature between the first and second scan cycles comprises:
  extracting a first circumference of the anatomical feature from the first three-dimensional model;
  extracting a second circumference of the anatomical feature from the second three-dimensional model;
  based on the first and second girth circumference, calculating an annotation circumference value; and
  labeling the second three-dimensional model with the annotation circumference value.

16. The method of claim 13:
wherein compiling the second set of images into the second three-dimensional model of the user comprises:
defining a set of discrete regions on the second three-dimensional model of the user; and
for each region in the set of discrete regions:
extracting a color patch from an image, in the second set of images, depicting a corresponding region of the user; and
mapping the color patch onto a region of the three-dimensional model corresponding to the region of the user; and
wherein annotating the second three-dimensional model of the user to indicate the difference in the anatomical feature of the user comprises:
applying a second color patch to a discrete region of the second three-dimensional model associated with the anatomical feature; and
wherein the second color patch differs from a first color patch previously mapped to the region of the three-dimensional model corresponding to the region of the user.

17. The method of claim 13, wherein generating the visualization of the second three-dimensional model annotated to indicate the difference in the anatomical feature comprises:
applying a texture model to a discrete region of the second three-dimensional model associated with the anatomical feature; and
wherein the texture model of the region associated with the anatomical feature differs from applied to an adjacent discrete region of the three-dimensional model not associated with the anatomical feature.

18. A method for modeling a human body comprising:
during a first time period:
initiating a first scan while a user occupies a scale platform at a first time;
during the first scan, capturing a first set of images along a path above the platform and about the user;
accessing a set of computational transforms that align a set of images; and
based on the set of computational transforms, compiling the first set of images into a three-dimensional first model of the user;
during a second time period:
initiating a second scan while the user occupies the scale platform at a second time;
during the second scan, capturing a second set of images along the path above the platform and about the user;
accessing the set of computational transforms; and
based on the set of computational transforms, compiling the second set of images into a second three-dimensional model of the user;
detecting a difference, in an anatomical feature of the user, between the first three-dimensional model and the second three-dimensional model; and
annotating the second three-dimensional model of the user to indicate the difference.

19. The method of claim 18, further comprising:
initiating an initial scan while the user occupies the platform at an initial time;
during the initial scan:
driving a sensor block comprising an optical sensor along the path above the platform and about the user; and
recording an initial sequence of images, via the sensor block, at each capture position in a sequence of capture positions along the path;
calculating the set of computational transforms that align the initial set of images; and
compiling the initial set of images according to the set of computational transforms to generate an initial three-dimensional model of the user.

20. The method of claim 18:
wherein compiling the second set of images into the second three-dimensional model of the user comprises:
defining a set of discrete regions on the second three-dimensional model of the user; and
for each region in the set of discrete regions:
extracting a color patch from an image, in the second set of images, depicting a corresponding region of the user; and
mapping the color patch onto a region of the three-dimensional model corresponding to the region of the user;
wherein annotating the second three-dimensional model of the user to indicate the difference in the anatomical feature of the user comprises:
applying a new color patch to a discrete region of the second three-dimensional model associated with the anatomical feature; and
wherein the new color patch differs from the color patch previously mapped to the region of the three-dimensional model corresponding to the region of the user.

* * * * *